(12) United States Patent
Haga

(10) Patent No.: US 8,444,841 B2
(45) Date of Patent: May 21, 2013

(54) PARTIAL PLATING METHOD, A LASER PLATING DEVICE, AND A PLATED MATERIAL

(75) Inventor: Koukichi Haga, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 833 days.

(21) Appl. No.: 12/309,468

(22) PCT Filed: Aug. 7, 2007

(86) PCT No.: PCT/JP2007/065464
§ 371 (c)(1),
(2), (4) Date: Jan. 21, 2009

(87) PCT Pub. No.: WO2008/018471
PCT Pub. Date: Feb. 14, 2008

(65) Prior Publication Data
US 2009/0288955 A1 Nov. 26, 2009

(30) Foreign Application Priority Data
Aug. 7, 2006 (JP) .................... 2006-214168
May 15, 2007 (JP) .................... 2007-129119

(51) Int. Cl.
*C25D 5/02* (2006.01)
*C25D 5/00* (2006.01)

(52) U.S. Cl.
USPC .............. 205/118; 205/136; 205/129; 205/92

(58) Field of Classification Search
USPC ............................................ 205/118, 136, 92
See application file for complete search history.

(56) References Cited

U.S. PATENT DOCUMENTS 3,791,938 A * 2/1974 Healy et al. ............... 205/122
4,217,183 A   8/1980 Melcher et al.
(Continued)

FOREIGN PATENT DOCUMENTS

| JP | A-55-148797 | 11/1980 |
| JP | A-59-042194 | 3/1984 |

(Continued)

OTHER PUBLICATIONS

German Office Action issued in German Patent Application No. 11 2007 001 818.6-45 dated Jan. 31, 2011 (with translation).

(Continued)

*Primary Examiner* — Keith Hendricks
*Assistant Examiner* — Stefanie Sherrill
(74) *Attorney, Agent, or Firm* — Oliff & Berridge, PLC

(57) ABSTRACT

A partial plating method capable of applying fine hard gold plating, a laser plating device capable of applying partial plating to a minute region with high positional precision, and a plated member. The partial plating method comprising plating a region to be plated by projecting a laser beam having a wavelength of 330 nm or more and 450 nm or less. A laser plating device comprises a plating tank, a laser oscillator for emitting a laser beam, a conveying device for conveying a member to be plated, a photoelectronic sensor for detecting the position of a positioning hole of the member to be plated, and a galvanometer scanner having a galvanometer mirror capable of scanning the laser beam. The plated member is applied with fine spot plating by the laser plating device.

9 Claims, 13 Drawing Sheets

U.S. PATENT DOCUMENTS

| | | | | |
|---|---|---|---|---|
| 4,230,538 A | * | 10/1980 | Turner | 205/97 |
| 4,432,855 A | * | 2/1984 | Romankiw et al. | 204/207 |
| 4,500,400 A | * | 2/1985 | Komoda et al. | 204/206 |
| 4,511,595 A | * | 4/1985 | Inoue | 427/581 |
| 5,098,526 A | | 3/1992 | Bernhardt | |
| 5,282,945 A | | 2/1994 | Riscke et al. | |
| 7,350,294 B2 | * | 4/2008 | Young | 29/846 |
| 2006/0070881 A1 | * | 4/2006 | Takada | 205/69 |

FOREIGN PATENT DOCUMENTS

| | | |
|---|---|---|
| JP | A-59-173292 | 10/1984 |
| JP | A-61-087891 | 5/1986 |
| JP | A-62-22326 | 1/1987 |
| JP | A-08-323486 | 12/1996 |
| JP | B2-2645201 | 5/1997 |
| JP | A-2008-038202 | 2/2008 |
| WO | WO 92/17627 A1 | 10/1992 |
| WO | WO 00/52231 A1 | 9/2000 |

OTHER PUBLICATIONS

Jun. 12, 2012 Office Action issued in Japanese Patent Application No. 2007-129119 (with translation).

* cited by examiner

PARTIAL PLATING METHOD, A LASER PLATING DEVICE, AND A PLATED MATERIAL

TECHNICAL FIELD

The present invention relates to a partial plating method to selectively plate a predetermined region of a member to be plated, a laser plating device, and a plated member. The present invention more particularly relates to a partial plating method suitably used to plate a minute region such as a contact portion of a connector terminal, a laser plating device, and a plated material plated using the laser plating device.

BACKGROUND ART

To partially plate a member to be plated, methods are widely used in which plating is applied while masking a region not to be plated of a member to be plated using a material such as a masking tape, a rubber insulator, and a polymer resist, and in which plating is applied by injecting a plating solution onto a region to be plated while energizing the member to be plated.

However, it is difficult to plate a minute region of a member to be plated by the above methods because the partial plating method using masking requires masking on a member to be plated, and the partial plating method using injection involves a large injection diameter.

As for a plating method capable of plating a minute region of a member to be plated, a plating method using a laser beam is known.

For example, Japanese Patent Examined Publication No. S59-1797 discloses a method for electroplating which projects a laser beam having intensity in a specific range onto a selected region to be metal plated and heats the region. By projecting the laser beam onto the selected region to be metal plated, the selected region is locally heated and the plating rate thereof is increased, thereby allowing partial plating on the selected region. Such a laser plating method focuses the laser beam onto a minute region in order to locally project the laser beam, and thus it is possible to plate the minute region of the member to be plated.

As the laser beam source, an argon ion laser beam source is mainly used. The argon ion laser, having a wavelength of about 500 nm which is absorbed by metal, is suitable for locally heating a metal member to be plated and capable of yielding high output.

In addition, connecting portions with other components or terminal portions of electric/electronic components such as connectors, switches, and lead materials are conventionally plated with metal such as tin and precious metal in order to improve characteristics such as electric connection reliability and corrosion resistance.

In particular, precious metals such as gold, palladium, silver and alloys thereof may be plated onto a region in which high connection reliability is required. In such a case, plating on regions other than regions which need to be plated results in an increased cost for manufacturing the components, due to high prices of precious metals. Accordingly, partial plating which selectively plates regions which need to be plated is used for such components.

With recent downsizing of electric/electronic devices, connecting components used for electric/electronic devices and electric/electronic components have become smaller, and accordingly regions to be plated of these components have become minute, which requires high positional precision in plating.

For example, when manufacturing a connector female terminal having an electric contact portion inside, hard gold plating is partially applied to a minute region of a ribbon plate, and then a coupled body in which a number of terminals are coupled to a carrier frame is formed by press working. To minimize the plating region, high positional precision of the plating region is required in order to avoid positional difference with the press working to be performed after the plating.

A plating device which can apply partial plating to a minute region of a member to be plated with high positional precision is disclosed in Japanese Patent No. 2645201. Japanese Patent No. 2645201 discloses a plating device which comprises a wheel-shaped guide means along which a member to be plated can be passed, and an endless masking means which is provided with a passage whose shape is adapted to a desired dot-shaped plating of the member to be plated.

The endless masking means comprises independent masking segments which are coupled in a manner which permits movement of the masking segments with respect to each other in a longitudinal direction, and each masking segment comprises a pilot pin. The pilot pin engages a positioning recess provided in the member to be plated, such that each masking segment is fully adjustable with respect to the plating region of the member to be plated. Accordingly, partial plating can be applied with high positional precision to a minute region of the member to be plated.

DISCLOSURE OF THE INVENTION

Problem to be Solved by the Invention

A portion such as a contact portion of a connector terminal where high wear resistance is required may also require high connection reliability and is thus provided with hard gold plating. A gold plating solution for hard gold plating includes cobalt ions which absorb an argon ion laser beam.

Accordingly, when applying fine hard gold plating to a contact portion of a connector terminal for example by a conventional laser plating method, a laser beam from an argon ion laser beam source is absorbed by cobalt ions in the gold plating solution and is attenuated before entering the surface of the connector terminal being a material to be plated. As a result, the interface between the connector terminal and the gold plating solution cannot be sufficiently heated, possibly causing insufficient plating.

With the plating device according to Japanese Patent No. 2645201 which uses a masking means, minimization of a plating region is limited by a limitation in making a mask which provides a minute plating region. In addition, plating is applied by pouring a pressurized plating solution into an opening of a mask, and thus the distribution of plating solution flow tends to be nonuniform, which also limits the minimization of a plating region.

Hence, the present invention aims to provide a partial plating method capable of applying fine hard gold plating to a region such as a contact portion of a connector terminal. The present invention also aims to provide a laser plating device capable of applying partial plating to a minute region of a member to be plated with high precision, and a plated member plated by the laser plating device.

Means for Solving Problem

An object of the invention is to overcome the problems described above and to provide a partial plating method comprising plating a region to be plated of a member to be plated which is in contact with a plating solution by projecting a laser beam having a wavelength of 330 nm or more and 450 nm or less onto the region to be plated.

It is preferable that the member to be plated is conveyed in the plating solution, and the laser beam is scanned from a scanning start position for a fixed period of time in synchronization with a movement of the member to be plated being conveyed in the plating solution, is projected onto the same region to be plated of the member to be plated for the fixed period of time, and is then returned to the scanning start position.

It is further preferable that the laser beam is scanned by being reflected by a movable mirror such as a polygon mirror and a galvanometer mirror.

It is also preferable that the laser beam is scanned by translational reciprocating motion of the laser beam emitting end opposing to the member to be plated of a laser beam source or a beam source optical system including a laser beam source. The translational reciprocating motion includes synchronizing for the fixed period of time with the movement of the member to be plated being conveyed in the plating solution and returning the laser beam emitting end to the scanning start position.

Alternatively, the member to be plated may be conveyed intermittently in the plating solution. The member to be plated is halted for a fixed period of time when the region to be plated of the member to be plated is placed in a projection position of the laser beam.

The laser beam may be emitted in plurality from one of a plurality of laser beam emitting ends of a plurality of laser beam sources and a plurality of laser beam emitting ends of a laser beam optical system including a laser beam source.

It is preferable that the plating solution flows in a direction different from a conveying direction of the member to be plated and a projecting direction of the laser beam.

A laser plating device according to the first preferred embodiment of the present invention comprises plating solution contact means for bringing a region to be plated of a member to be plated having a positioning hole for positioning of the region to be plated of the member to be plated into contact with a plating solution, laser oscillation means for emitting a laser beam which is projected onto the region to be plated of the member to be plated which is in contact with the plating solution so that a plating metal is deposited on the member to be plated, conveying means of the member to be plated for conveying the member to be plated so that the member to be plated passes through the plating solution contact means, position detecting means for detecting that the positioning hole of the member to be plated being conveyed by the conveying means of the member to be plated is placed in a predetermined position, and laser beam scanning means, including a movable mirror which is arranged on an optical path of the laser beam and is capable of scanning the laser beam, for having the laser beam follow and scan the same region to be plated of the member to be plated being conveyed in the plating solution and returning the laser beam to a position where the following and the scanning are started when the position detecting means detects that the positioning hole is placed in the predetermined position.

Here, the position detecting means is preferably one of a photoelectronic sensor and an image processing device.

The position detecting means preferably comprises rotating means having an engage portion which engages the positioning hole of the member to be plated, and a rotary encoder attached to the rotating means.

Here, synchronization between the detection by the position detecting means that the positioning hole is placed in the predetermined position and the returning of the laser beam to the position where the following and the scanning are started is preferably performed by electric control.

A laser plating device according to the second preferred embodiment of the present invention comprises plating solution contact means for bringing a member to be plated into contact with a plating solution, intermittent conveying means of the member to be plated for performing intermittent conveyance of the member to be plated by repeating conveyance and halt of the member to be plated in order to pass the member to be plated through the plating solution contact means, laser oscillation means for emitting a laser beam which is projected onto the member to be plated which is in contact with the plating solution during the halt so that a plating metal is deposited on the member to be plated, and positioning means, including an ascent/descent pin which moves in ascent/descent motion and a shaft thereof is fixed to a position having a fixed positional relation with a projection position of the laser beam emitted by the laser oscillation means, for performing positioning of the laser beam projection position by the laser oscillation means onto the member to be plated.

Here, the intermittent conveyance of the member to be plated by the intermittent conveying means of the member to be plated and the ascent/descent motion of the ascent/descent pin by the positioning means are preferably synchronized by a mechanical connection such as a cam.

In the laser plating device according to the second preferred embodiment of the present invention, it is preferable that the member to be plated comprises a positioning hole preformed in the member to be plated for positioning of a region to be plated, the ascent/descent pin is a pilot pin having a tapered tip, and the pilot pin is threaded through the positioning hole.

It is also preferable that the ascent/descent pin has a tip shape capable of perforating the member to be plated, and perforates and is threaded through a hole in the member to be plated.

A plated member according to the present invention comprises a region to be plated on which a partial plating is formed by bringing the region to be plated into contact with a plating solution and projecting a laser beam having a wavelength of 330 nm or more and 450 nm or less onto the region to be plated so that a plating metal is deposited on the region irradiated with the laser beam.

Here, the region on which the partial plating is formed defines a contact portion of a connecting terminal.

A plated member according to the present invention is provided with one or more partial platings formed by the above laser plating device.

Effect of the Invention

The partial plating method according to the present invention performs plating using a laser beam having a wavelength of 330 nm or more and 450 nm or less. Accordingly, when, for example, applying hard gold plating to a region to be plated of a member to be plated such as a contact portion of a connector terminal, the laser beam is hardly absorbed by cobalt ions included in the gold plating solution, preventing the laser beam to be attenuated before entering the surface of the connector terminal. The interface between the connector terminal and the gold plating solution can thus be sufficiently heated, and hard gold plating is reliably applied to portions such as a contact portion of a connector terminal.

Because the partial plating method according to the present invention does not involve masking of a region not to be plated of a member to be plated or injection of the plating solution onto a region to be plated. The laser beam is locally projected onto a minute region, and thus plating can be applied to a minute region to be plated of a member to be plated.

Continuous plating is made possible by conveying the member to be plated in the plating solution. The laser beam is scanned from the scanning start position in synchronization with the movement of the member to be plated being conveyed in the plating solution for a fixed period of time and is then returned to the scanning start position after the fixed period time, and the laser intensity applied to the region to be plated of the member to be plated is ensured to be sufficient without slowing down the conveying speed of the member to be plated in the plating solution. Accordingly, the plating rate of the member to be plated can be increased.

If the laser beam is scanned by being reflected by a movable mirror such as a polygon mirror and a galvanometer mirror, the laser intensity applied to the region to be plated of the member to be plated is ensured to be sufficient without slowing down the conveying speed of the member to be plated in the plating solution.

In addition, if the laser beam is scanned by translational reciprocating motion of one of a laser beam emitting end opposing to the member to be plated of a laser beam source or a beam source optical system including a laser beam source, the translational reciprocating motion including synchronizing with the movement of the member to be plated being conveyed in the plating solution for the fixed period of time and returning the laser beam emitting end to the scanning start position, the laser intensity applied to the region to be plated of the member to be plated is ensured to be sufficient without slowing down the conveying speed of the member to be plated in the plating solution.

Alternatively, if the member to be plated is conveyed in the plating solution and is halted for a fixed period of time when the region to be plated of the member to be plated is placed in a projection position of the laser beam, the laser intensity applied to the region to be plated of the member to be plated is ensured to be sufficient without slowing down the conveying speed of the member to be plated in the plating solution.

If the laser beam is emitted in plurality from one of a plurality of laser beam emitting ends of a plurality of laser beam sources and a plurality of laser beam emitting ends of a laser beam optical system including a laser beam source, and is projected onto one region, the laser intensity applied to the region to be plated of the member to be plated is increased, resulting in a shorter projecting time required for plating and an increased plating rate.

When, for example, a plurality of laser beams are projected onto different regions, a plurality of regions having different shapes and a plurality of regions which differ in position can be simultaneously plated.

If a plurality of laser beams have different projecting angles, plating can be applied simultaneously to a region having a three-dimensional shape such as the periphery of a terminal in addition to a plane region.

If the plating solution flows, a fresh plating solution with high metal ion concentration is supplied on a region to be plated of the member to be plated, thereby suppressing the decrease in the plating rate due to low metal ion concentration. Additionally, if the plating solution flows in a direction which is different from the conveying direction of the member to be plated and the projecting direction of the laser beam, it is possible to reduce the thickness of the plating solution on the member to be plated and to provide a quartz glass window over the plating solution.

In the laser plating device according to the first preferred embodiment of the present invention, the conveying means of the member to be plated conveys the member to be plated in the plating solution in the plating solution contact means, and the laser beam scanning means has the laser beam follow and scan the same region to be plated of the member to be plated for a fixed period of time to apply plating. The plating is applied to the region irradiated with the laser beam, and thus a minute plating spot can be formed by finely adjusting the laser beam.

When the position detection means detects that the positioning hole is placed in the predetermined position, the laser beam returns to the scanning start position to start projection onto the next region to be plated. Accordingly, a minute plating spot can be formed in a region having a fixed positional relation with the positioning hole with high precision, thereby applying partial plating to a minute region of the member to be plated with high precision.

If the position detection means is one of a photoelectronic sensor and an image processing device, noncontact detection of the positioning hole can be performed at high speed and with high precision, enabling continuous conveyance of the member to be plated.

If the position detecting means comprises rotating means having an engage portion which engages the positioning hole, and a rotary encoder attached to the rotating means, detection of the positioning hole can be performed at high speed and with high precision, enabling continuous conveyance of the member to be plated.

If the synchronization between the detection by the position detecting means that the positioning hole is placed in the predetermined position and the returning of the laser beam to the position where the following and the scanning are started is performed by electric control, they can be synchronized at high speed and with high precision.

In the laser plating device according to the second preferred embodiment of the present invention, the intermittent conveying means of the member to be plated conveys the member to be plated in the plating solution in the plating solution contact means, and the laser oscillation means emits a laser beam during the halt to apply partial plating to a minute region of the member to be plated. Here, the ascent/descent pin of the position detecting means is threaded through the halted member to be plated to perform positioning of the projection position of the laser beam emitted by the laser oscillation means on the member to be plated. Because the ascent/descent pin moves in ascent/descent motion and the shaft thereof is fixed to the position having the fixed positional relation with the projection position of the laser beam emitted by the laser oscillation means, it is possible to plate a fixed minute region of the member to be plated with high precision.

If the intermittent conveyance of the member to be plated by the intermittent conveying means of the member to be plated and the ascent/descent motion of the ascent/descent pin by the positioning means are synchronized by a mechanical connection such as a cam or by electric control, the laser beam projection position can be positioned at high speed and with high precision.

If the member to be plated comprises a positioning hole for positioning of the region to be plated, and the ascent/descent pin is a pilot pin having a tapered tip, the projection position of the laser beam on the member to be plated can be adjusted with high precision so that it has the fixed positional relation with the positioning hole, by threading the pilot pin through the positioning hole in the member to be plated.

If the ascent/descent pin has a tip shape capable of perforating the member to be plated, the positioning hole can be formed with high precision at a position having a fixed positional relation with the projection position of the laser beam. The formed positioning hole can also be used as the positioning hole when pressing the plated member after plating. In this case, the process of forming the positioning hole before plating is not necessary, and the number of processes can be reduced.

The plated member according to the present invention comprises a region to be plated on which a partial plating is formed by bringing the region to be plated into contact with a plating solution and projecting a laser beam having a wavelength of 330 nm or more and 450 nm or less onto the region to be plated so that a plating metal is deposited on the region irradiated with the laser beam. Accordingly, even when hard gold is used as plating metal, the plated member is reliably applied with hard gold plating.

The plated member reliably applied with hard gold plating provides a good electrical contact, when the partial plating is formed on a region defining a contact portion of a connecting terminal.

The plated member according to the present invention is provided with one or more partial platings using the above laser plating device and the plating spots are formed in minute regions with high positional precision.

BEST MODE FOR CARRYING OUT THE INVENTION

A detailed description of a partial plating method according to the present invention will now be given with reference to the accompanying drawings.

The partial plating method according to the present invention uses a laser beam having a wavelength of 330 nm or more and 450 nm or less. More preferably, a laser beam having a wavelength of 350 nm or more and 420 nm or less is used. The laser beam having a wavelength of 330 nm or more and 450 nm or less is a laser beam in the ultraviolet to blue wavelength region, and a semiconductor laser beam source can be used for a source of such a laser beam.

The partial plating method according to the present invention uses a laser beam having a wavelength of 330 nm or more and 450 nm or less, because this makes it possible to apply hard gold plating to a minute region of a portion such as a contact portion of a connector terminal where high wear resistance is required, for reasons described below.

Figure 1:
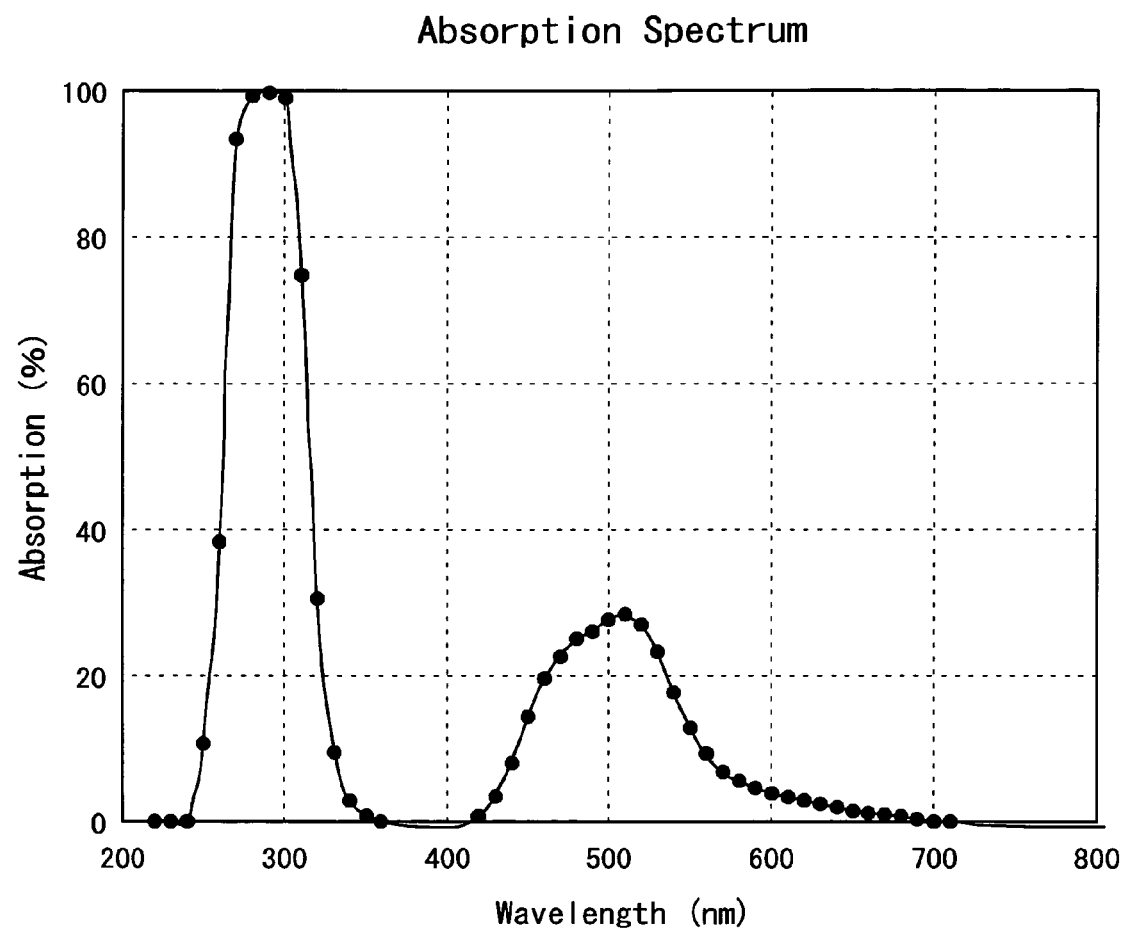
FIG. 1 is a graph showing the absorption spectrum of a gold plating solution used for hard gold plating.

FIG. 1 shows the absorption spectrum of a gold plating solution used for hard gold plating. The hard gold plating solution MULTIBRIGHT 16C manufactured by Tanaka Kikinzoku Group is used to measure the absorption spectrum for a path length of 1 centimeter.

The gold plating solution used for hard gold plating includes cobalt ions so as to increase the hardness of gold plating. Accordingly, as shown in FIG. 1, absorption rates are high around 300 nm, moderate around 500 nm, and weak from 330 nm to 450 nm. Generally, a member to be plated such as a contact portion of a connector terminal is made from Cu or Cu alloy, and Ni undercoating is applied thereon. With metals such as Cu, Ni, and Au, as the wavelength becomes longer relative to 300 nm, reflection is gradually increased while absorption is decreased.

Accordingly, it is preferable to use a laser beam which is difficult to be absorbed by the gold plating solution and is easy to be absorbed by the member to be plated in order to effectively heat by the laser beam a region to be plated of a member to be plated which is in contact with a gold plating solution for hard gold plating. The laser beam is difficult to be absorbed by the gold plating solution when it has a wavelength in the range between 330 nm and 450 nm or a wavelength in the range of 600 nm or more as shown in FIG. 1, and is easy to be absorbed by the member to be plated when its wavelength is shorter. Accordingly, the partial plating method according to the present invention uses the laser beam having a wavelength in the range between 330 nm and 450 nm.

Conventional laser plating methods use an argon ion laser beam having a wavelength of around 500 nm, and thus the argon ion laser beam is significantly absorbed by the gold plating solution for hard gold plating. Conventional laser plating methods are thus not suitable to apply hard gold plating to a member to be plated.

In the partial plating method according to the present invention, plating is applied by projecting a laser beam having a wavelength of 330 nm or more and 450 nm or less onto a region to be plated of a member to be plated which is in contact with a plating solution.

As a plating metal, gold containing cobalt ions to be used for hard gold plating is especially preferable as described above. In addition, precious metals such as gold containing nickel, gold, silver, platinum, and palladium, and plating metals used for general plating may be used.

The partial plating method according to the preferred embodiment of the present invention is especially suitable to apply to a member to be plated which requires high wear resistance such as a contact portion of a connector terminal, but also applicable to any member to be plated with plating metal.

The partial plating method according to the present invention uses wet plating using a plating solution which may be either of electrolytic plating or nonelectrolytic plating. In either case, because a laser beam is used in the plating method, it is not necessary to preheat the plating solution before applying plating, and the plating solution can be locally heated by the laser beam to a temperature at which plating is possible. Of course, the plating solution may be preheated so as to assist the heating by the laser beam.

Because the partial plating method according to the present invention locally heats a region to be plated by projecting a laser beam thereto to enhance plating, not only a flat surface but also an inclined surface with respect to the projecting direction of the laser beam can be plated.

In the partial plating method according to the present invention, it is preferable that continuous plating is performed by conveying a member to be plated through a plating solution. A description of an example of a laser plating device which is preferably used in the partial plating method according to the present invention will be given.

Figure 2:
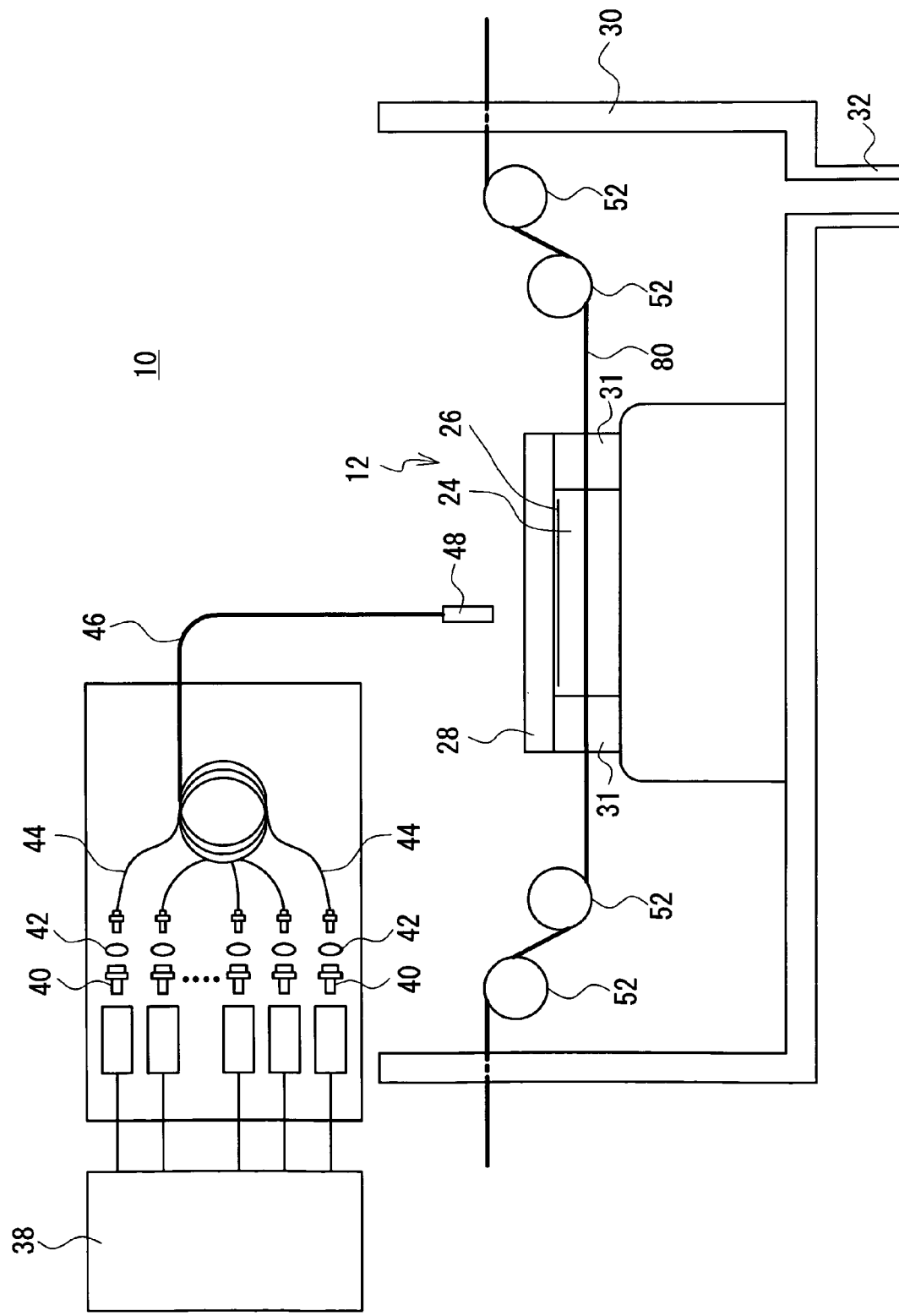
FIG. 2 is schematic elevation view showing an example of a laser plating device which is preferably used in a partial plating method according to the present invention.
Figure 3:
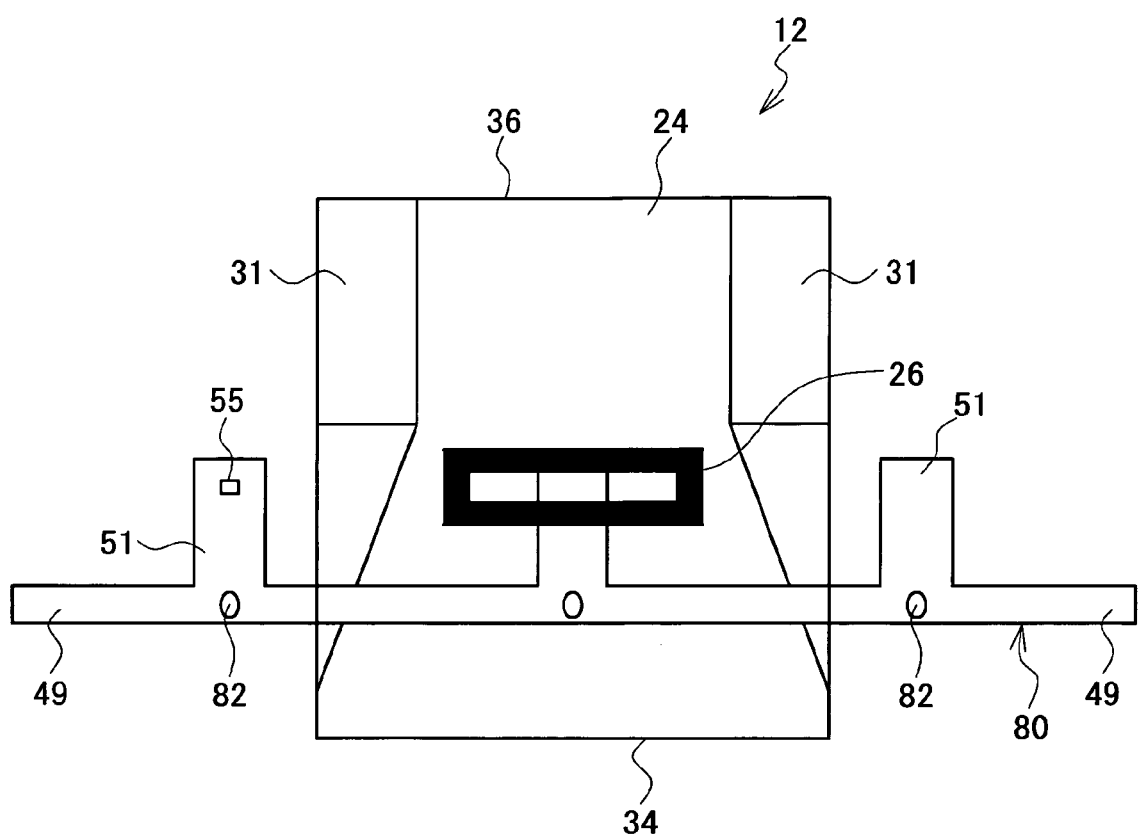
FIG. 3 is an enlarged plain view schematically showing a plating tank.
Figure 4:
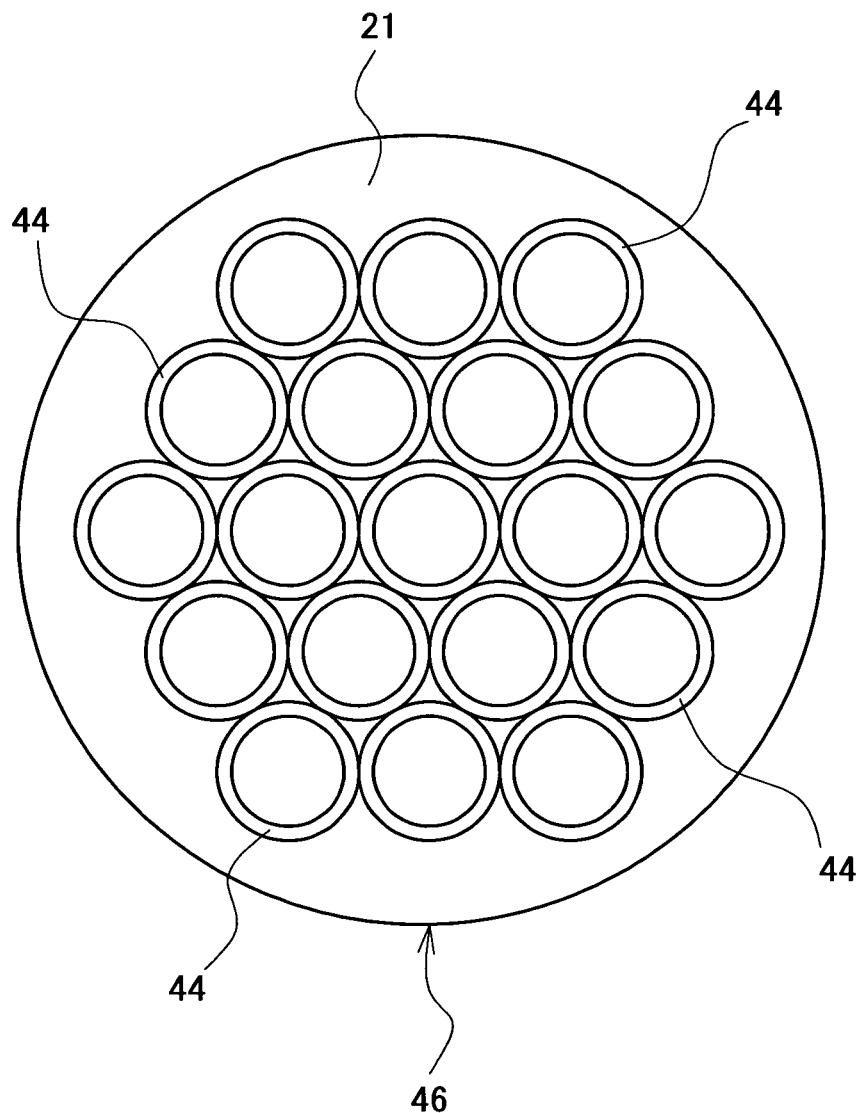
FIG. 4 is a schematic view showing the emitting end of a fiber array including a plurality of fibers bundled together.

FIG. 2 is a schematic elevation view showing an example of a laser plating device which is preferably used in the partial plating method according to the present invention, FIG. 3 is an enlarged plain view schematically showing a plating tank, and FIG. 4 is a schematic view showing the emitting end of a fiber array including a plurality of fibers bundled together.

FIGS. 2 and 3 show that a laser plating device 10 comprises a plurality of semiconductor laser modules (laser beam sources) 40 which emit ultraviolet to blue wavelength laser beams and are connected with a laser diode control circuit 38 having a plurality of channels. On the emission direction of the plurality of semiconductor laser modules 40, multimode optical fibers 44 are arranged via collimator lenses 42. The laser beam entering the multimode optical fiber 44 is led through the multimode optical fiber 44 while subjected to repetitive total reflection, and thus the laser beam emitted from the multimode optical fiber 44 has uniform intensity distribution over the radius direction of the multimode optical fiber 44. A plurality of multimode optical fibers 44 are densely bundled into a fiber array 46. By collecting a plurality of laser beams emitted from the plurality of semiconductor laser modules 40, an output which yields heat enough for plating can be obtained.

In FIG. 2, the plurality of semiconductor laser modules (laser beam sources) 40 are each provided with the corresponding multimode optical fiber 44 via the collimator lens 42; however, it is also preferable that a laser beam emitted from one semiconductor laser module (laser beam source) 40 is divided by an optical divider such as a half mirror to enter the plurality of multimode optical fibers 44.

FIG. 4 shows that the fiber array 46 is made of the plurality of multimode optical fibers 44 which are densely bundled and a covering material 21, such as resin, surrounding them. At the emitting end of the fiber array 46, an imaging lens 48 which forms an image of the laser beam emitted from the emitting end as a laser beam projecting spot, and the imaging lens 48 is arranged opposing to a plating tank 12 in which a plating solution flows.

A beam source optical system including the laser beam source is constituted as described above. The emitting shape and the beam profile of the laser beam emitted from the emitting end are adjustable by on/off adjustment or output power adjustment of each semiconductor laser module 40 and by changing how the plurality of multimode optical fibers 44 of the fiber array 46 are bundled. Accordingly, the shape of the plating spot can be optimized.

The plating tank 12 comprises a flow path 24, in which the plating solution flows, and side walls 31, and the front and back sides of the plating tank 12 in the flowing direction are opened. A quartz glass plate 28 through which the laser beam passes covers the top face of the plating tank 12, preventing the imaging lens 48 from being splashed with the flowing plating solution. When a member to be plated 80 has a plate shape, the quartz glass plate 28 can uniform the thickness of the plating solution over the member to be plated 80, thereby suppressing deviation in the projecting spot due to factors such as reflection and refraction on the surface of the plating solution. Accordingly, the plating tank 12 can be placed vertically or horizontally in the laser plating device 10.

An anode 26 having a window is arranged in the plating tank 12 such that it is immersed in the plating solution, and the laser beam emitted from the emitting end of the fiber array 46 is scanned from the right end of the window defining a scanning start position to the left end.

On the outside of the plating tank 12, a collecting tank 30 is provided which collects the flowing plating solution for circulation. A plating solution inlet 32 extrudes from the bottom of the collecting tank 30, and the plating solution flowing out of a plating solution exit 34 is collected through the plating solution inlet 32 using a pump or other tool to reenter a plating solution entrance 36 of the plating tank 12.

As shown in FIG. 3, the member to be plated 80 comprises a long carrier frame 49 and a plurality of terminal metal fittings 51 coupled to the carrier frame 49 at regular intervals, and is winded preferably on a reel (not shown). The terminal metal fitting 51 is formed by die-cutting a plate made of a material such as a copper base alloy by press working or other manners to have a predetermined shape, and is then formed into a predetermined shape by applying bending or other processes. The terminal metal fitting 51 coupled to the long carrier frame 49 before plating may be in a developed state before bending or in a three-dimensional state after bending. The long carrier frame 49 is provided with positioning holes 82 which are used to move in order the terminal metal fitting 51 coupled to the long carrier frame 49.

The long member to be plated 80 is guided into the plating tank 12 by rolls 52 and passes though the plating tank 12 so that it is immersed in the plating solution. Some of the rolls 52 are feeding rolls and are connected with the minus side of an electrical power source for plating (not shown) to form a cathode.

In the partial plating method according to the present invention, if the member to be plated 80 is conveyed in the plating solution, it is possible to continuously apply plating onto regions to be plated of the member to be plated 80. In this case, it is preferable that the laser beam is scanned from the scanning start position in synchronization with the movement of the member to be plated 80 being conveyed in the plating solution for a fixed period of time, thus is projected onto one region to be plated of the member to be plated 80 for the fixed period of time, and is then returned to the scanning start position.

For example, when the member to be plated 80 is moved at uniform speed, the laser beam is scanned by following the member to be plated 80 from the scanning start position for a distance equal to the distance between regions to be plated of the member to be plated 80 and is then returned to the scanning start position at high speed so that the next region to be plated of the member to be plated 80 is irradiated. By repeating this procedure, it is possible to apply plating at uniform intervals to regions to be plated of the member to be plated 80 while continuously projecting the laser beam. Accordingly, the partial plating method according to the present invention is applicable to a plating line in mass production of components such as connecter terminal metal fittings in which the member to be plated 80 comprising the plurality of terminal metal fittings 51 coupled to the carrier frame 49 at uniform intervals is conveyed in the plating solution to be continuously plated.

In order to move the laser beam as described above, it is preferable that the emitting end of the fiber array 46 and the imaging lens 48 move in translational reciprocating motion such that they move in synchronization with the movement of the member to be plated 80 being conveyed in the plating solution for the fixed period of time and then return to the scanning start position.

It is also preferable that a movable mirror such as a rotating polygon mirror and a plane mirror including a galvanometer mirror is arranged between the imaging lens 48 and the member to be plated 80 (preferably between the imaging lens 48 and the quartz glass plate 28 when the quartz glass plate 28 is placed above the member to be plated 80), and the laser beam collected by the imaging lens 48 is reflected by the movable mirror for scanning. Here, the movable mirror moves such that the laser beam is moved in synchronization with the movement of the member to be plated 80 being conveyed in the plating solution for the fixed period of time and is then returned to the scanning start position.

Alternatively, it is possible to perform continuous plating by conveying the material to be plated 80 through the plating solution without scanning the laser beam as described above. This is performed by moving the member to be plated 80 being conveyed in the plating solution in a certain manner, while fixing the emitting end of the fiber array 46 and the imaging lens 48. When a region to be plated of the member to be plated 80 comes to be placed in the position onto which the laser beam is projected, the member to be plated 80 is halted for a fixed period of time. Accordingly, the laser dose applied to the region to be plated of the member to be plated 80 is secured, enabling continuous plating of the member to be plated 80. After the fixed period of time, the member to be plated 80 starts to be moved again so that the next region to be plated comes to be placed in the position onto which the laser beam is projected.

When the long member to be plated 80 is guided into the plating tank 12 by the rolls 52 and a region to be plated of the member to be plated 80 passes under the window of the anode 26, the laser beam is projected onto the region to be plated via the emitting end of the fiber array 46 and the imaging lens 48 by either of the scanning methods described above. When the laser beam is projected onto the region to be plated of the member to be plated 80, the interface between the member to be plated 80 being irradiated with the laser beam and the plating solution is locally heated, thereby partially forming a plating 55 on the region to be plated.

If an optical sensor or other component is used in moving the member to be plated 80, noncontact positioning can be performed, and deviation in distances between plating spots can be reduced. Accordingly, the partial plating 55 can be applied with high positional precision.

In the partial plating method according to the present invention, the number of laser beam emitting ends of the laser beam source 40 and the number of laser beam emitting ends of the beam source optical system including the laser beam source 40 are not limited to one and they may be provided in a plurality.

When there is a plurality of laser beam emitting ends of the laser beam source 40 or a plurality of laser beam emitting ends of the beam source optical system including the laser beam source 40, the same region or different regions can be simultaneously irradiated with a plurality of laser beams. In addition, a plurality of laser beams having different projecting angles can be simultaneously projected.

Projecting the plurality of laser beams from the plurality of laser beam emitting ends onto one region increases the laser intensity applied to the region to be plated of the member to be plated 80, which results in a shorter projecting time required for plating and an increased plating rate. When the plurality of terminal metal fittings 51 in series are simultaneously irradiated with the plurality of laser beams, the conveyance speed of the member to be plated 80, i.e. the productivity of the plating line can be increased by a factor of the number of regions to be simultaneously irradiated.

When a female terminal into which a tab male terminal is inserted is applied with plating on a region which comes into contact with one surface of the tab of the male terminal (e.g., the top surface) and a region which comes into contact with another surface of the tab of the male terminal (e.g., the bottom surface), the two regions to be plated differ in shape and position. Such regions to be plated which differ in shape and position can be simultaneously plated by projecting a plurality of laser beams onto the different regions.

When applying plating in a ring shape to the periphery of a cylindrical terminal, plating can be applied by projecting a plurality of laser beams onto the periphery of the cylindrical terminal while changing the projecting angles. In addition, the top and bottom surfaces of a plate member to be plated can be simultaneously plated using two opposing laser beam emitting ends whose projecting angles differ by 180 degrees. By using a plurality of laser beams having different projecting angles as described above, plating can be applied simultaneously to a region having a three-dimensional shape in addition to a plane region.

In the partial plating method according to the present invention, it is preferable that the plating solution flows in a direction different from the conveying direction of the member to be plated 80 and the projecting direction of the laser beam. In FIG. 3, the member to be plated 80 is moved from the right to the left, the laser beam is projected perpendicular to the plane of the drawing sheet from the front side to the back side, and the plating solution flows from the top to the bottom. That is, the plating solution flows in a direction perpendicular to both the conveying direction of the member to be plated 80 and the projecting direction of the laser beam.

The plating solution does not necessarily need to flow in a direction precisely perpendicular to both the conveying direction of the member to be plated 80 and the projecting direction of the laser beam. If the plating solution flows in a direction which is different from the above directions, it is possible to reduce the thickness of the plating solution on the member to be plated 80 and to provide a quartz glass window.

Regardless of plating by conveying the member to be plated 80 in the plating solution continuously or intermittently, if the plating solution flows, a fresh plating solution with high metal ion concentration is supplied on a region to be plated of the member to be plated 80, thereby suppressing the decrease in the plating rate due to low metal ion concentration.

In the conventional laser plating methods using an argon ion laser beam, if the plating solution flows so as to supply the fresh plating solution with high metal ion concentration to a region to be plated of the member to be plated 80, the energy of the laser beam may flow out of the region to be plated along with the flowing plating solution because the plating solution absorbs the laser beam during plating. This does not occur with the partial plating method according to the present invention.

Before plating the member to be plated 80 by the partial plating method according to the present invention, the member to be plated 80 is subjected to pretreatment for cleaning and surface activation, and, if necessary, undercoating is applied. After plating is applied to the member to be plated 80, the member to be plated 80 is cleaned and dried.

The partial plating method according to the present invention performs plating using a laser beam having a wavelength of 330 nm or more and 450 nm or less. Accordingly, when, for example, applying hard gold plating to a region to be plated of a member to be plated such as a contact portion of a connector terminal, the laser beam is hardly absorbed by cobalt ions included in a gold plating solution, preventing the laser beam to be attenuated before entering the surface of the connector terminal. The interface between the connector terminal and the gold plating solution can thus be sufficiently heated, and hard gold plating is reliably applied to portions such as a contact portion of a connector terminal.

By using a laser beam, the plating deposition rate is significantly increased compared with plating without a laser beam, and thus the plating time can be shortened. In plating while conveying a member to be plated in the plating solution for example, the shorter plating time can shorten the length of the plating tank, which is determined by the product of the plating time and the moving speed of the member to be plated, and can thus decrease the installation area of the plating line. The smaller plating tank means a less amount of plating solution. Additionally, because it is not necessary to heat the plating solution to high temperatures, maintenance of the plating solution is made easy.

The laser beam is collected and locally projected to a minute region, and thus plating can be applied to a minute region to be plated of a member to be plated. Accordingly, the amount of precious metal needed for plating can be reduced.

Because the partial plating method according to the present invention does not involve masking of a region not to be plated of a member to be plated, a consumable item such as a mask is not needed. Accordingly, it is not necessary to pour a plating solution into a narrow opening of a mask, and thus plating can be applied to a minute region without interference of residual bubble or other factors. In addition, even when a member to be plated such as a terminal material is thin and minute, the member to be plated is not deformed because a force, which may be exerted when a rubber mask for example is tightly adhered, is not exerted on the member to be plated.

Continuous plating is made possible by conveying the member to be plated in the plating solution. The laser beam is scanned from the scanning start position in synchronization with the movement of the member to be plated being conveyed in the plating solution for a fixed period of time and is then returned to the scanning start position after the fixed period time, and the laser dose applied to the region to be plated of the member to be plated is ensured to be sufficient without slowing down the conveying speed of the member to be plated in the plating solution. Accordingly, the plating rate of the member to be plated can be increased.

A description of a laser plating device according to preferred embodiments of the present invention will be given referring to drawings.

Figure 5:
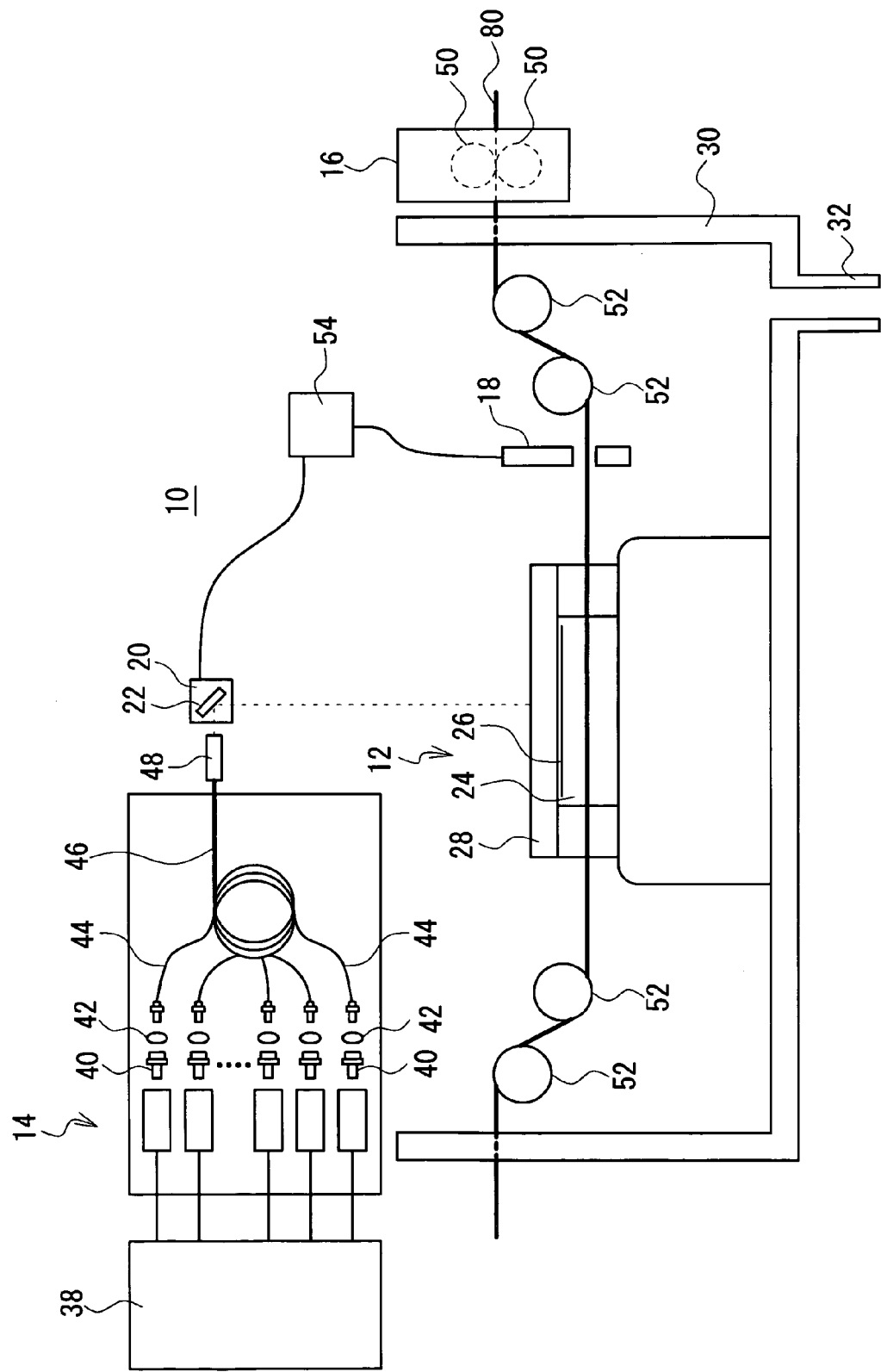
FIG. 5 is a schematic view showing a laser plating device according to a first preferred embodiment of the present invention.
Figure 6:
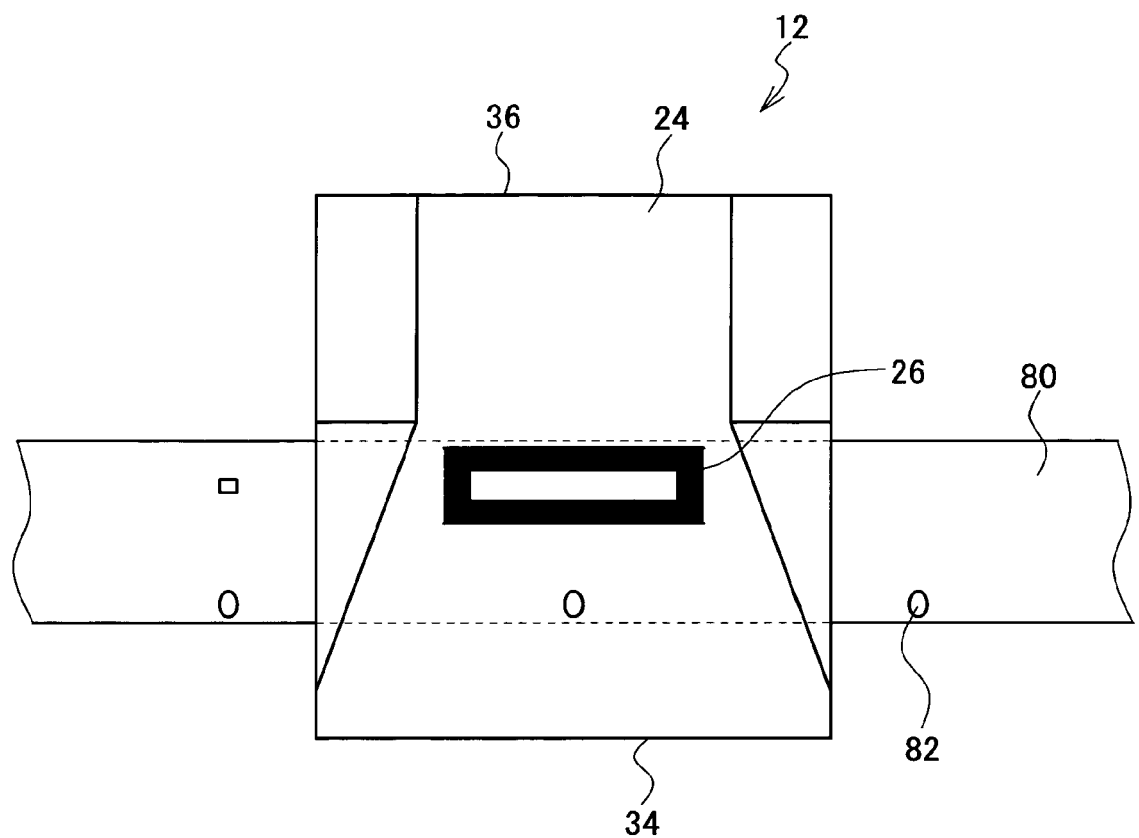
FIG. 6 is an enlarged plain view of the plating tank shown in FIG. 5.
Figure 7A:
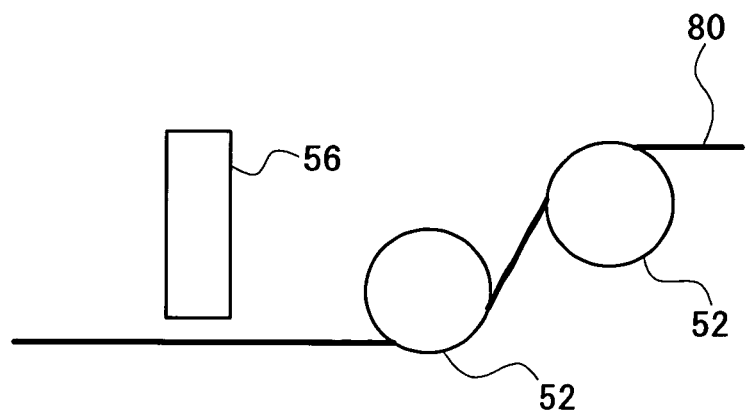
FIG. 7A is a schematic view showing an image processing device which can be used in place of a photoelectronic sensor shown in FIG. 5.
Figure 7B:
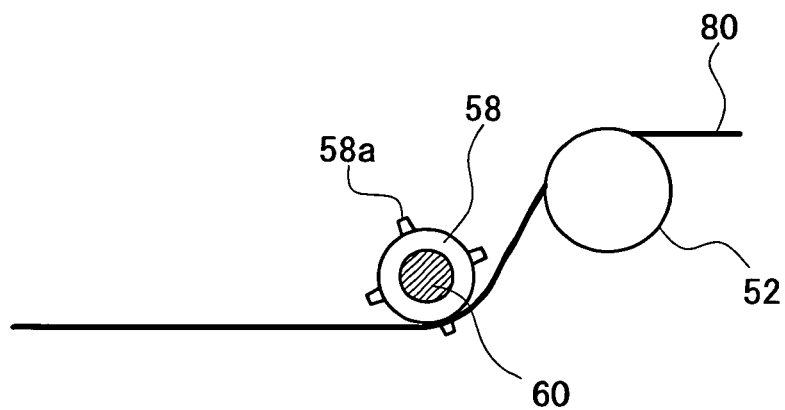
FIG. 7B is a schematic view showing a device combining a sprocket and a rotary encoder which can be used in place of the photoelectronic sensor shown in FIG. 5.
Figure 8:
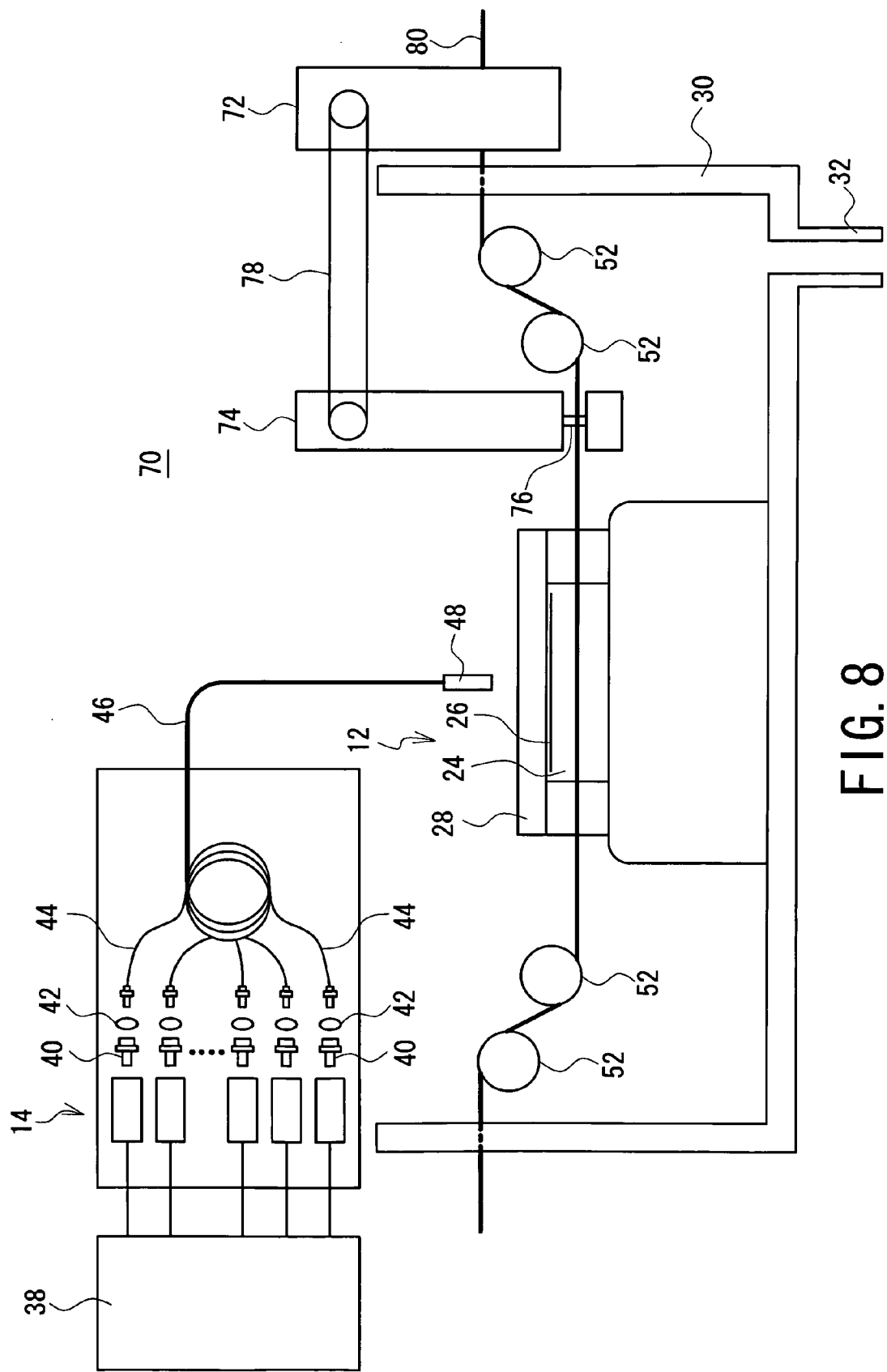
FIG. 8 is a schematic view showing a laser plating device according to a second preferred embodiment of the present invention.

FIG. 5 is a schematic view showing a laser plating device according to a first preferred embodiment of the present invention. FIG. 6 is an enlarged plain view of the plating tank shown in FIG. 5. FIG. 7A is a schematic view showing an image processing device which can be used in place of the photoelectronic sensor shown in FIG. 5, and FIG. 7B is a schematic view showing a device combining a sprocket and a rotary encoder which can be used in place of the photoelectronic sensor shown in FIG. 5. FIG. 8 is a schematic view showing a laser plating method according to a second preferred embodiment of the present invention. FIGS. 9 to 13 are views showing plated members according to preferred embodiments of the present invention.

FIG. 5 shows that a laser plating device 10 according to the first preferred embodiment of the present invention comprises a plating tank 12 for bringing a member to be plated 80 into contact with a plating solution, a laser oscillator 14 for emitting a laser beam which is projected onto the member to be plated 80 being conveyed in the plating solution in the plating tank 12 so that a plating metal is deposited on the member to be plated 80, a conveying device 16 for conveying the member to be plated 80 so that the member to be plated 80 passes in the plating solution in the plating tank 12 to be continuously irradiated with the laser beam, a photoelectronic sensor 18 for detecting the position of the member to be plated 80 being conveyed, and a galvanometer scanner 20 having a galvanometer mirror 22 which is arranged on the optical path of the laser beam and capable of scanning the laser beam.

The plating tank 12 is placed in the center of the laser plating device 10 and is provided with a flow path 24 in which the plating solution flows in the direction perpendicular to the conveying direction of the long member to be plated 80. In the flow path 24 of the plating solution, an anode 26 which is thin and substantially in the shape of a rectangle is arranged along the conveying direction of the member to be plated 80. The anode 26 is used for electrolytic plating and is immersed in the plating solution. A window is formed in the center of the anode 26, and a side of the window in upstream in the moving direction of the member to be plated 80 defines the scanning start position of the laser beam. The laser beam is scanned within the window of the anode 26.

The quartz glass plate 28 through which the laser beam can pass covers the top face of the plating tank 12 and uniforms the thickness of the plating solution flowing on the member to be plated 80, thereby suppressing deviation in the projecting spot due to factors such as reflection and refraction on the surface of the plating solution. On the outside of the plating tank 12, a collecting tank 30 is provided which collects the flowing plating solution for circulation. A plating solution inlet 32 extrudes from the bottom of the collecting tank 30, and the plating solution flowing out of a plating solution exit 34 is collected by the plating solution inlet 32 using a pump or other tools to reenter a plating solution entrance 36 of the plating tank 12 for circulation.

The laser oscillator 14 comprises a plurality of semiconductor laser modules (laser beam sources) 40 which are connected with a laser diode control circuit 38 having a plurality of channels. On the emission direction of the plurality of semiconductor laser modules 40, multimode optical fibers 44 are arranged via collimator lenses 42. The laser beam entering the multimode optical fiber 44 is led through the multimode optical fiber 44 while subjected to repetitive total reflection, and thus the laser beam emitted from the multimode optical fiber 44 has uniform intensity distribution over the radius direction of the multimode optical fiber 44.

The plurality of multimode optical fibers 44 are densely bundled into a fiber array 46. By collecting a plurality of laser beams emitted from the plurality of semiconductor laser modules 40, an output which yields enough heat for plating can be obtained. At the emitting end of the fiber array 46, an imaging lens 48 which forms an image of the laser beam emitted from the emitting end as a laser beam projecting spot is fixed. This means that the laser beam emitting position of the laser oscillator 14 is fixed with respect to the plating tank 12 in which the plating solution flows.

When the laser beam is projected by the laser oscillator 14 onto the member to be plated 80 being conveyed in the plating solution, the region of the member to be plated 80 which is irradiated with the laser beam is heated, and thus plating is applied to the member to be plated 80. The emitting shape and the beam profile of the laser beam emitted from the emitting end are adjustable by on/off adjustment or output power adjustment of each semiconductor laser module 40 and by changing how the plurality of multimode optical fibers 44 of the fiber array 46 are bundled. Accordingly, the shape of the plating spot can be optimized.

The plurality of semiconductor laser modules 40 are each provided with the corresponding multimode optical fiber 44 via the collimator lens 42; however, it is also preferable that a laser beam emitted from one semiconductor laser module 40 is divided by an optical divider such as a half mirror to enter the plurality of multimode optical fibers 44.

In upstream in the moving direction of the member to be plated 80, the conveying device 16 is arranged which continuously conveys the member to be plated 80. The conveying device 16 accommodates a pair of convey rolls 50 which hold and covey the member to be plated 80. The member to be plated 80 conveyed out of the conveying device 16 is guided into the plating tank 12 by guide rolls 52 arranged between the conveying device 16 and the plating tank 12. Some of the guide rolls 52 are feeding rolls and are connected with the minus side of an electrical power source for plating (not shown) to form a cathode.

On the convey path of the member to be plated 80 between the conveying device 16 and the plating tank 12, a photoelectronic sensor 18 is arranged which detects the position of the conveyed member to be plated 80. As shown in FIG. 6, the positioning hole 82 for positioning of a region to be plated is formed in the long member to be plated 80, and the position of the positioning hole 82 is detected by the photoelectronic sensor 18 when the positioning hole 82 passes through the photoelectronic sensor 18. The detected position is used as a reference position for projecting the laser beam onto a position having a fixed positional relation with the positioning hole 82. Accordingly, positioning of the region to be plated of the member to be plated 80 is performed.

The positioning hole 82 used as the reference for positioning can be selected from either the positioning holes 82 which is formed near the region to be plated or one of the positioning holes 82 which is formed far from the region to be plated depending on the installation position of the photoelectronic sensor 18 or other factors.

If the photoelectronic sensor 18 is used to detect the position of the conveyed member to be plated 80, the detection can be performed without coming into contact with the member to be plated 80. Accordingly, the member to be plated 80 is regularly conveyed, and the member to be plated 80 and the photoelectronic sensor 18 are less prone to be damaged in use and thus can be used longer. In addition, the photoelectronic sensor 18 enables an increased response speed and detection with high precision.

As the photoelectronic sensor 18, a photoelectronic sensor of a transmission type may be used which comprises a projector which emits a signal light, such as a visible light and an infrared light, and a photoreceiver which is arranged opposing to the projector and detects a change in the intensity of the signal light emitted by the projector, which is caused by an object to be detected passing between the projector and the photoreceiver. Alternatively, a photoelectronic sensor of a reflection type may be used which comprises a projecting/receiving device including a projector which emits a signal light and a photoreceiver which detects the signal light emitted by the projector and then reflected by a reflecting plate.

With the photoelectronic sensor of a transmission type, the photoelectronic sensor detects the positioning hole 82 when the light path between the projector and the photoreceiver opposing to each other is cut off by the member to be plated 80. With the photoelectronic sensor of a reflection type, the photoelectronic sensor detects the positioning hole 82 when the signal light emitted by the projector and then reflected by the reflecting plate is cut off by the member to be plated 80. In other words, positional detection can be performed because the light path of the photoelectronic sensor is cut off when the positioning hole 82 of the member to be plated 80 reaches and passes the light path.

The positioning hole 82 is also used for conveying in order the member to be plated 80. The member to be plated 80 is made of a long plate material such as a copper base alloy, is formed by die-cutting the plate material to have a predetermined shape before or after the plating process, and is then formed into a predetermined shape by applying bending. The positioning hole 82 can also be used for positioning in processing process (e.g. pressing process, bending process). By using the positioning hole 82 both in the plating process and the processing process, positional deviation between the processes can be minimized.

On the optical path of the laser beam emitted by the laser oscillator 14, the galvanometer mirror 22 is arranged which reflects and guides the laser beam onto the member to be plated 80. The galvanometer mirror 22 is rotatable and capable of changing the reflection angle of the laser beam by rotating. By repeating the rotation of the galvanometer mirror 22 by a fixed angle in a forward/reverse direction in a fixed cycle, the reflection angle of the laser beam is set within a fixed range, the scanning start position and the scanning end position of the laser beam are set to fixed positions, and the laser beam is repetitively scanned in the fixed cycle.

The galvanometer mirror 22 is arranged on the tip of the galvanometer scanner 20 which performs the operations described above. The galvanometer scanner 20 rotates the galvanometer mirror 22 by a predetermined angle at a fixed speed so as to scan the laser beam at the same speed as the conveying speed of the member to be plated 80, such that the laser beam reflected by the galvanometer mirror 22 follows the member to be plated 80. In addition, the galvanometer scanner 20 receives signals from the photoelectronic sensor 18 via a controller 54 and adjusts the angle of the galvanometer mirror 22 by electronic control so that the laser beam is returned to the position where the following and the scanning are started.

Because the position of the positioning hole 82 and the scanning start position are in a fixed positional relation, the laser beam can be projected with high precision using the position of the positioning hole 82 as a reference position. In addition, synchronization between the detection by the photoelectronic sensor 18 that the positioning hole 82 is placed in a predetermined position and the returning of the laser beam to the position where the following and the scanning are started is performed by electronic control, and therefore the detection and the returning can be synchronized at high speed and with high precision.

When the laser beam is scanned on the member to be plated 80, the laser beam is projected onto the same region of the member to be plated 80. Accordingly, the period of time of laser scanning defines the period of time of partial plating on one region to be plated. By applying plating using the laser beam with high energy, the period of time of plating can be significantly decreased compared with a conventional wet plating method using masking. For example, it is possible to plate one region in $1/100$ second to some seconds.

The photoelectronic sensor 18 is used as a position detection means which detects that the positioning hole 82 of the conveyed member to be plated 80 is placed in the predetermined position. Alternatively, other components may be used as the position detection means.

For example, an image processing device can be used in place of the photoelectronic sensor 18. The image processing device has a camera such as a CCD camera, converts an image of an object photographed by the camera into digital signals, extracts characteristics of the object such as the position by arithmetic processing, and outputs an evaluation result based on set references.

In order to detect the position of the positioning hole 82 of the member to be plated 80 using the image processing device, a CCD camera 56 which photographs the positioning hole 82 of the member to be plated 80 is arranged above the conveyed member to be plated 80 as shown in FIG. 7A. An image photographed by the CCD camera 56 is divided into pixels to be recognized as coordinates, and pattern recognition of the shape of the positioning hole 82 being an object of photographing is performed preferably by gray scale processing. For example, the center position of the positioning hole 82 is determined, and a signal is outputted when the center of the positioning hole 82 is placed in a predetermined position. The galvanometer scanner 20 receives the signal from the image processing device via the controller 54 and adjusts the angle of the galvanometer mirror 22 by electronic control so that the laser beam is returned to the position where the following and the scanning are started.

Still alternatively, a sprocket 58 having an engage portion 58a which engages the positioning hole 82 of the member to be plated 80 and a rotary encoder 60 which is attached to the sprocket 58 to determine the rotating angle of the sprocket 58 may be used in place of the photoelectronic sensor 18 as shown in FIG. 7B. For example, when the rotary encoder 60 obtains the rotation angle by which the engage portion 58a of the sprocket 58 is placed in a predetermined position, a signal is generated indicating that the engage portion 58a is in the predetermined position. Accordingly, the position of the positioning hole 82 can be detected at high speed and with high precision.

In the laser plating device 10 according to the first preferred embodiment of the present invention, the laser beam to be projected onto the same region of the member to be plated 80 for a fixed period of time scans and follows the member to be plated 80 being continuously conveyed in the plating solution, and the laser beam is returned to the scanning start position when the positioning hole 82, which is preformed in the member to be plated 80, is detected to be placed in the predetermined position in order to start projection onto the next region to be plated of the member to be plated 80.

In other words, the laser beam is projected for the fixed period of time onto a region of the member to be plated 80 having a fixed positional relation with the positioning hole 82. By finely adjusting the laser beam, the interface between the member to be plated 80 and the plating solution is locally heated, thereby applying partial plating to a minute region of the member to be plated 80 with high precision.

In addition, the laser intensity applied to the region to be plated of the member to be plated 80 is ensured to be sufficient without slowing down the conveying speed of the member to be plated 80 in the plating solution, and therefore the plating rate of the member to be plated 80 can be increased. Accordingly, the partial plating method according to the first preferred embodiment of the present invention can continuously apply partial plating to a region to be plated of the member to be plated 80 while continuously emitting the laser beam, and is thus applicable to a plating line in mass production of components such as connecter terminal metal fittings.

A description of a laser plating device according to the second preferred embodiment of the present invention will be given next.

A laser plating device 10 according to the second preferred embodiment of the present invention comprises the plating tank 12 for bringing the member to be plated 80 into contact with the plating solution, a conveying device 72 which intermittently conveys the member to be plated 80 in the plating solution in the plating tank 12, the laser oscillator 14 for emitting a laser beam which is projected onto the member to be plated 80 being conveyed in the plating solution in the plating tank 12 so that a plating metal is deposited on the member to be plated 80, and an ascent/descent mechanism of pilot pin 74 which comprises a pilot pin 76 movable in ascent/descent motion and performs positioning of laser projection by inserting the pilot pin 76 in the positioning hole 82 preformed in the conveyed member to be plated 80. The configurations of the plating tank 12 and the laser oscillator 14 and their installation positions are same as those in the laser plating device 10 according to the first preferred embodiment of the present invention, and their descriptions are thus omitted.

The conveying device 72 is arranged in upstream in the conveying direction of the member to be plated 80 and intermittently conveys the member to be plated 80 in a fixed cycle. More specifically, the conveying device 72 repeats, in the fixed cycle, operations of conveying the member to be plated 80 for a fixed distance, then halting for a fixed time period, and again conveying for the fixed distance. As a method for intermittently conveying the member to be plated 80, a general method such as a kinetic friction method including an intermittent rotation method and an oscillating rotation method and a static friction method including a grip method is used.

A conveying device of the intermittent rotation method is provided with a pair of convey rolls which hold and convey the member to be plated 80. The pair of convey rolls simultaneously rotate and intermittently convey the member to be plated 80.

A conveying device of the oscillating rotation method is provided with a pair of fan-like conveying members each having a fixed rotation shaft, and the member to be plated 80 is held and conveyed by curved surfaces of the pair of fan-like conveying members. In simultaneous rotation of the pair of fan-like conveying members, the member to be plated 80 is held and moved when the curved surfaces are facing to each other, and is halted when the curved surfaces are not facing to each other. Accordingly, the member to be plated 80 is intermittently conveyed.

A conveying device of the grip method is provided with a pair of grips for holding the member to be plated 80 whose contact surfaces with the member to be plated 80 are substantially plane. The pair of grips repeatedly move forward and backward for a fixed distance. More specifically, the pair of grips move for the fixed distance while holding the member to be plated 80, then release the member to be plated 80, and then return to the position where they catch hold of the member to be plated 80, such that the intermittent conveyance of the member to be plated 80 is performed.

The member to be plated 80 conveyed out of the conveying device 72 is guided into the plating tank 12 by the guide rolls 52 arranged between the conveying device 72 and the plating tank 12. On the conveying path of the member to be plated 80 from the conveying device 72 to the plating tank 12, the ascent/descent mechanism of pilot pin 74 which comprises the pilot pin 76 movable in ascent/descent motion is arranged. The shaft of the pilot pin 76 is fixed to a position having a fixed positional relation with a fixed projection position of the laser beam by the laser oscillator 14. The positioning hole 82 for positioning of the region to be plated is formed in the long member to be plated 80, and the pilot pin 76 is threaded through the positioning hole 82 by the ascent/descent motion for adjusting the laser beam projection position.

As described above, the member to be plated 80 is intermittently conveyed by the conveying device 72. More specifically, when the region to be plated of the member to be plated 80 is placed in the laser beam projection position, the member to be plated 80 is haled for a fixed time period and is then conveyed again after partial plating is applied by projecting the laser beam.

Here, if the distances between the positioning holes 82 formed in the member to be plated 80 are set to be constant, and the member to be plated 80 is intermittently conveyed by each distance, the region to be plated can be placed in the laser beam projection position. However, a deviation due to a positional error in forming the positioning holes 82, a deviation in the intermittent conveyance, or other factors may result in a slight deviation in the positional relation between the positioning holes 82 and the laser beam projection position.

In such a case, the laser plating device 10 according to the second preferred embodiment of the present invention can correct (finely adjust) the slight deviation in the positional relation between the positioning holes 82 and the laser beam projection position, because positioning is performed by threading the pilot pin 76, whose shaft is fixed to the position having the fixed positional relation with the fixed projection position of the laser beam, through the positioning hole 82. Accordingly, the positional relation between the positioning holes 82 and the laser beam projection position is always precisely maintained to be constant, and thus partial plating can be applied to the member to be plated 80 with high precision. After the laser beam is projected for the fixed period of time, the pilot pin 76 ascends to be pulled out of the positioning hole 82, in order to start moving the next region to be plated to the laser beam projection position.

It is preferable that the pilot pin 76 fits within the positioning hole 82 so that the positioning holes 82 and the laser beam projection position has the precise positional relation. In other words, it is preferable that the outer diameter of the pilot pin 76 is slightly smaller than and almost equal to the inner diameter of the positioning hole 82. In addition, it is preferable that the pilot pin 76 has a tapered tip, so that the pilot pin 76 can be easily threaded through the positioning hole 82.

The ascent/descent mechanism of pilot pin 74 may be placed close to the laser beam projection position where possible, and one of the positioning holes 82 which is nearest to the region to be plated may be used as the reference for positioning. However, the ascent/descent mechanism of pilot pin 74 is placed far from the laser beam projection position for convenience of installation space, and in such a case, one of the positioning holes 82 which is far from the region to be plated may be used as the reference.

In the ascent/descent mechanism of pilot pin 74, if the pilot pin 76 is replaced by an object having a tip shape capable of perforating the member to be plated 80 such as a drill and a punch, it is not necessary to preform the positioning hole 82 in the member to be plated 80. Because the shaft of the drill or punch is fixed to a position having a fixed positional relation with the laser beam projection position, a hole formed in the member to be plated 80 by the drill or punch, which defines the positioning hole 82, has the fixed positional relation with the laser beam projection position. Accordingly, partial plating can be applied to a portion having the fixed positional relation with the positioning hole 82.

In a general pressing process, a die is provided with a pilot pin which is inserted in the positioning hole 82 formed in the member to be plated 80 to position the member to be plated 80 for the pressing process. If the member to be plated 80 is die-cut in a pressing process after the plating process, the positioning hole 82 can be used in the pressing process. In such a case, the number of processes can be reduced, because it is not necessary to form the positioning hole 82 before the plating process.

Two-axis control is applicable to the conveyance by the conveying device 72 and the ascent/descent motion of the pilot pin 76 performed by the ascent/descent mechanism of pilot pin 74. As shown in FIG. 8, the ascent/descent motion of the pilot pin 76 is synchronized with the rotating motion of the conveying device 72 by a mechanical cam via a belt 78. More specifically, using the cam, the pilot pin 76 of the ascent/descent mechanism of pilot pin 74 descends and ascends in synchronization with the cycle of halting the conveyance in the intermittent conveyance of the member to be plated 80 by the conveying device 72. The time between the descent and the ascent is set according to the laser beam projection time.

Alternatively, the synchronization between the rotating motion of the conveying device 72 and the ascent/descent motion of the pilot pin 76 as described above is obtainable by electronic control using an encoder and a servomotor. By synchronizing the rotating motion of the conveying device 72 and the ascent/descent motion of the pilot pin 76 by mechanically combining them preferably using the cam or by electronic control, the laser beam projection position can be positioned at high speed and with high precision.

With the laser plating device 70 according to the second preferred embodiment of the present invention, positioning of the member to be plated 80 is obtained by inserting the pilot pin 76, whose shaft is fixed to the position having the fixed positional relation with the fixed projection position of the laser beam, into the positioning hole 82 of the member to be plated 80 to be intermittently conveyed in the plating solution. In addition, the same region of the member to be plated 80 having the fixed positional relation with the positioning hole 82 is irradiated for a fixed period of time while the member to be plated 80 is halted, in order to apply partial plating with high precision. Accordingly, even though the laser beam source is fixed and the laser beam is not scanned, it is possible to continuously apply plating.

Because both the member to be plated 80 and the optical axis of the laser beam stand still during the projection of the laser beam, the positional precision of the plating spot is further improved and thus becomes the same as or more than that in a stationary pressing process.

Because the laser plating device 70 according to the second preferred embodiment of the present invention uses a laser beam, the plating deposition rate is significantly improved compared with plating without a laser beam, and thus the plating time can be shortened. In plating by conveying the member to be plated 80 in the plating solution, the shorter plating time can shorten the length of the plating tank 12, which is determined by the product of the plating time and the moving speed of the member to be plated 80, and can thus shorten the installation area of the plating line. A smaller plating tank 12 means a less amount of plating solution. Additionally, because it is not necessary to heat the plating solution to high temperatures, maintenance of the plating solution is made easy.

The laser beam is collected and locally projected to a minute region, and thus plating can be applied to a minute region to be plated of the member to be plated 80. Accordingly, the amount of precious metal needed for plating can be reduced.

Because the laser plating devices according to the first and second embodiments of the present invention do not involve masking of a region not to be plated of the member to be plated 80, a consumable item such as a mask is not needed. It is not necessary to pour a plating solution through a narrow opening in a mask, and thus plating can be applied to a minute region without being interfered with residual bubble or other factors. In addition, even when a member to be plated 80 is made of for example a thin, minute terminal material, the member to be plated 80 is not deformed because a force, which is exerted when a rubber mask for example is tightly adhered, is not exerted on the member to be plated 80.

The laser beam source 40 is not specifically limited and may emit an argon ion laser beam and a semiconductor laser beam. For applying hard gold plating to a minute region of a portion such as a contact portion of a connector terminal where high wear resistance is required, it is preferable to use the semiconductor laser beam which is difficult to be absorbed by a gold plating solution for hard gold plating and is easy to be absorbed by the member to be plated 80.

A gold plating solution for hard gold plating contains cobalt ions, and its absorption wavelength is around 500 nm. When using this gold plating solution, it is preferable to use a semiconductor laser beam whose wavelength is 330 nm or more and 450 nm or less and thus is not in the range of the absorption wavelength of the gold plating solution.

The plating metal is not specifically limited. It is preferable to use gold containing cobalt ions for hard gold plating for an electric contact portion of a connector terminal or other components as described above. In addition, precious metals such as gold containing nickel, gold, silver, platinum, and palladium, and plating metals such as nickel and tin used for general plating may be used.

If the member to be plated 80 is a connector terminal as described above, a copper base alloy is most preferably used; however it is not limited thereto and any member to be plated with the above described plating metal is used.

The partial plating method according to the present invention uses wet plating which may be either of electrolytic plating or nonelectrolytic plating. In either case, because a laser beam is used in the plating method, it is not necessary to preheat the plating solution before applying plating, and the plating solution can be locally heated by the laser beam to a temperature at which plating is possible. Of course, the plating solution may be preheated so as to assist the heating by the laser beam.

Because the region to be partially plated is locally heated by projecting a laser beam thereto to enhance plating, not only a flat surface but also an inclined surface with respect to the projecting direction of the laser beam can be plated.

The number of laser beam emitting ends of the laser beam source 40 or the beam source optical system including the laser beam source 40 is not limited to one and they may be provided in a plurality. When there is a plurality of laser beam emitting ends of the laser beam source 40 or of the beam source optical system including the laser beam source 40, the same region or different regions can be simultaneously irradiated with a plurality of laser beams. In addition, a plurality of laser beams having different projecting angles can be simultaneously projected.

Projecting the plurality of laser beams from the plurality of laser beam emitting ends onto one region increases the laser intensity applied to the region to be plated of the member to be plated 80, which results in a shorter projecting time required for plating and an increased plating rate. When the plurality of terminal metal fittings 51 in series are simultaneously irradiated with the plurality of laser beams, the conveying speed of the member to be plated 80, i.e. the productivity of the plating line can be increased by a factor of the number of regions to be simultaneously irradiated.

When a female terminal into which a tab male terminal is inserted is applied with plating on a region which comes into contact with one surface of the tab of the male terminal (e.g., the top surface) and a region which comes into contact with another surface of the tab of the male terminal (e.g., the bottom surface), the two regions to be plated differ in shape and position. A plurality of regions to be plated which differ in shape and position can be simultaneously plated by projecting a plurality of laser beams onto different regions.

When applying plating in a ring shape to the periphery of a cylindrical terminal, plating can be applied by projecting a plurality of laser beams onto the periphery of the cylindrical terminal while changing the projecting angles. In addition, the top surface and the bottom surface of a plate member to be plated 80 can be simultaneously plated using two opposing laser beam emitting ends of the laser beam source or laser beam emitting ends of the beam source optical system including the laser beam source whose projecting angles differ by 180 degrees. By using the plurality of laser beams having different projecting angles as described above, plating can be applied simultaneously to a region having a three-dimensional shape in addition to a plane region.

When applying partial plating, it is preferable that the plating solution flows in a direction different from the conveying direction of the member to be plated 80 and the projecting direction of the laser beam. In FIG. 6, the member to be plated 80 is moved from the right to the left, the laser beam is projected perpendicular to the plane of the drawing sheet from the front side to the back side, and the plating solution flows from the top to the bottom. That is, the plating solution flows in a direction perpendicular to both the conveying direction of the member to be plated 80 and the projecting direction of the laser beam.

The plating solution does not necessarily need to flow in a direction precisely perpendicular to both the conveying direction of the member to be plated 80 and the projecting direction of the laser beam. If the plating solution flows in a direction which is different from the above directions, it is possible to reduce the thickness of the plating solution on the member to be plated 80 and to provide a quartz glass window 28.

Regardless of continuous plating by conveying the member to be plated 80 in the plating solution or non-continuous plating, if the plating solution flows, a fresh plating solution with high metal ion concentration is supplied on a region to be plated of the member to be plated 80, thereby suppressing the decrease in the plating rate due to low metal ion concentration.

Before plating the member to be plated 80, the member to be plated 80 is subjected to pretreatment for cleaning and surface activation, and, if necessary, undercoating is applied. After plating is applied to the member to be plated 80, the member to be plated 80 is cleaned and dried.

A description of a plated member according to the present invention will be given next.

The plated member according to the present invention is a member to which one or more partial platings are applied using the above laser plating device. By using a laser beam, fine partial plating is applied to a minute region (spot plating).

Examples of the plated member according to the present invention include: a long thin plate member in a strip shape to which one or more spot platings are applied; a coupled member comprising a carrier frame and a number of terminal metal fittings in a developed state each of which is pressed (die-cut) into a terminal shape, has one or more spot platings, and is coupled to the carrier frame; the coupled member with the terminal metal fittings subjected to a bending process and a terminal cut off from the coupled member. However, the plated member according to the present invention is not limited to them. In addition, the plated member according to the present invention may be a male terminal and a female terminal. Because one or more partial platings are applied to the plated member according the present invention using the above laser plating device, a fine, minute plating spot is provided with high positional precision.

A coupled member having terminal metal fittings in a developed state may be formed by applying spot plating to a long thin plate member in a strip shape and then die-cutting the long thin plate member into a terminal shape by a pressing process, or it may be formed by apply a pressing process to the long thin plate member in a strip shape and then applying spot plating to the terminal metal fittings in a developed state.

If a positioning hole is preformed in the long thin plate member in a strip shape, it is preferable that spot plating is applied after the pressing process, such that the positioning hole can be formed in the pressing process for die-cutting into the terminal shape.

Generally, before applying spot plating to a member to be plated, undercoating of nickel or other material is applied to the base material of the member to be plated in order to prevent corrosion of the base material and to form a barrier layer which prevents diffusion between the base material and the plating. The undercoating is applied before applying spot plating in the plating process. Accordingly, if spot plating is applied after the pressing process, portions which are unnecessary for forming the terminal are removed from the long thin plate member in a strip shape before applying the undercoating and thus are not undercoated. As a result, the amount of undercoat can be reduced. In addition, the side surface which is die-cut and exposed after the pressing process is also undercoated, thereby preventing corrosion.

In addition, because the portions which are unnecessary for forming the terminal are removed from the long thin plate member in a strip shape, when applying spot plating of precious metal, the area of the member to be plated which comes in contact with the precious metal plating solution is reduced. Accordingly, the amount of the precious metal solution adheres to the member to be plated after spot plating is reduced, thereby reducing loss of the costly precious metal solution.

Figure 9:
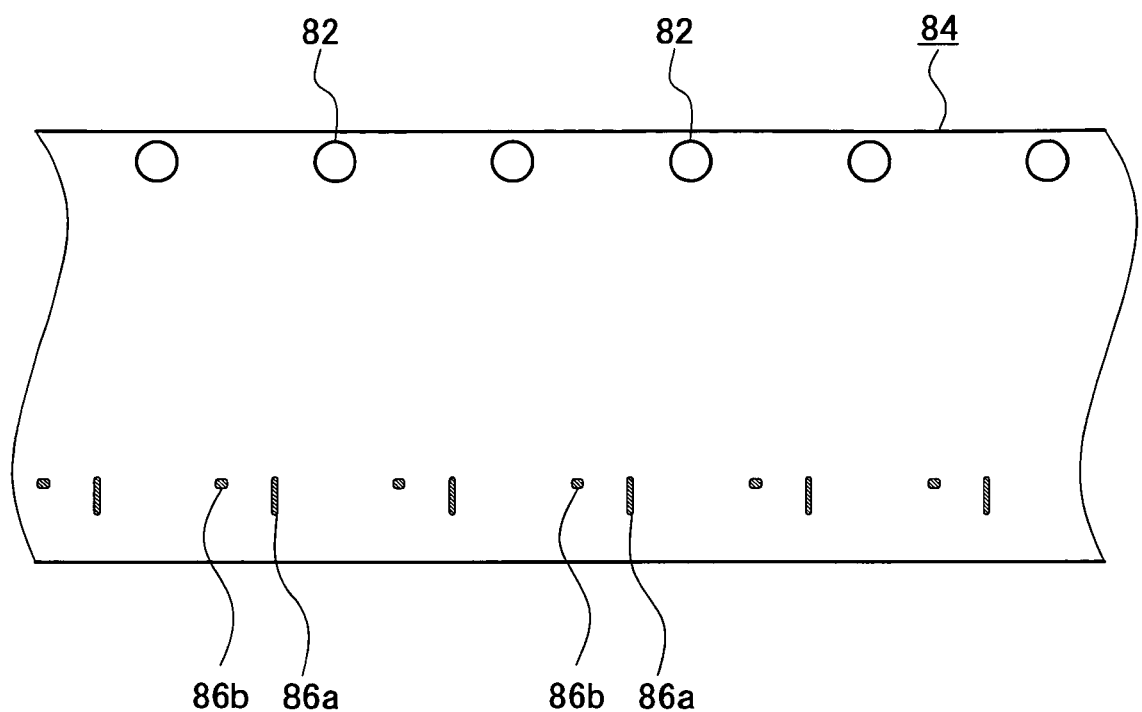
FIG. 9 is a view showing a plated member according to a preferred embodiment of the present invention.

FIG. 9 shows a long thin plate member in a strip shape 84 to which one or more spot platings are applied. On one side in the width direction of the thin plate member in a strip shape 84, a plurality of positioning holes 82 are formed at intervals. Two large and small spot platings 86a and 86b in different shapes which correspond to each of the positioning holes 82 are formed in positions having fixed positional relations with the positioning hole 82. The thin plate member in a strip shape 84 is in a state before it is subjected to a pressing process for forming terminal fittings, and become a female terminal after subjected to die-cutting and bending in a pressing process. The two spot platings 86a and 86b become contact portions used to hold and bring conduction with a male terminal of a component to be connected. The two spot platings 86a and 86b having different shapes can be obtained by, for example, simultaneously irradiating two regions with two laser beams.

Figure 10:
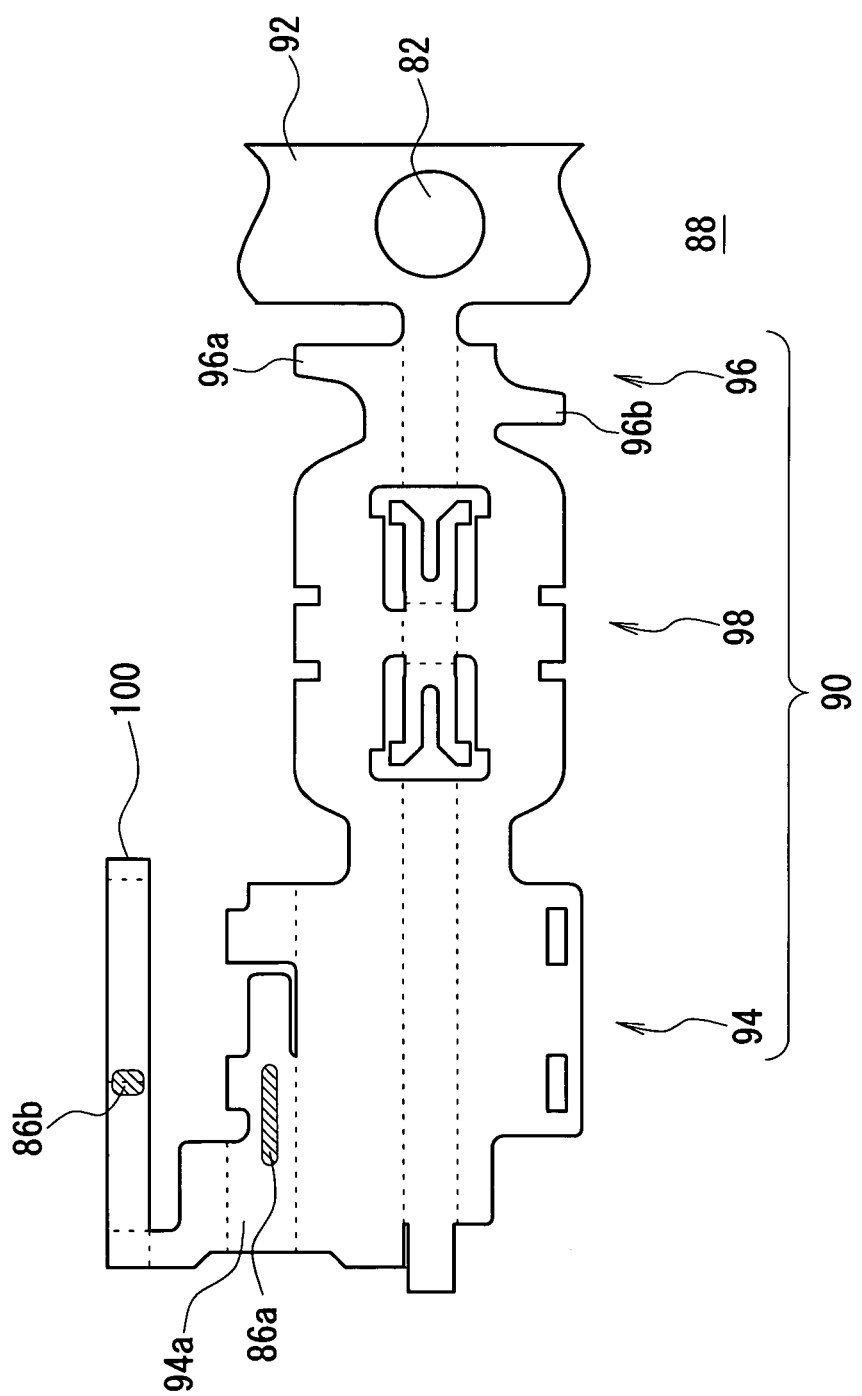
FIG. 10 is a view showing a plated member according to a preferred embodiment of the present invention.

FIG. 10 shows a coupled member 88 comprising a carrier frame 92 and a number of terminal metal fittings 90 in a developed state which are pressed into a terminal shape, each have one or more spot platings, and are coupled to the carrier frame 92. As shown in FIG. 10, on the side far from the carrier frame 92 of each of the terminal metal fittings 90 of the coupled member 88 which are in a developed state and coupled to the carrier frame 92, a mating tube portion 94 which becomes a square tube into which a male terminal of a component to be connected is formed. On the side closer to the carrier frame 92, a crimping section 96 having a pair of crimping portions 96a and 96b for crimping an end of an electric wire which is connected to this terminal is extended from the mating tube portion 94. In addition, a center portion 98 is formed between the mating tube portion 94 and the crimping section 96.

An elastic contact portion 100 for elastic contact with the male terminal to be inserted into the mating tube portion 94 is formed extending from the mating tube portion 94. When the mating tube portion 94 is formed in a square tube shape by a bending process, the elastic contact portion 100 is placed facing to a ceiling plane 94a of the mating tube portion 94. The elastic contact portion 100 is bended at the center such that the crest is placed toward the ceiling plane 94a in order to elastically hold the male terminal with the ceiling plane 94a. Spot platings 86b and 86a are formed on the bend defining the crest of the elastic contact portion 100 and on the ceiling plane 94a of the mating tube portion 94 respectively. These portions become contact portions used to hold and bring conduction with the male terminal of the component to be connected.

Figure 11:
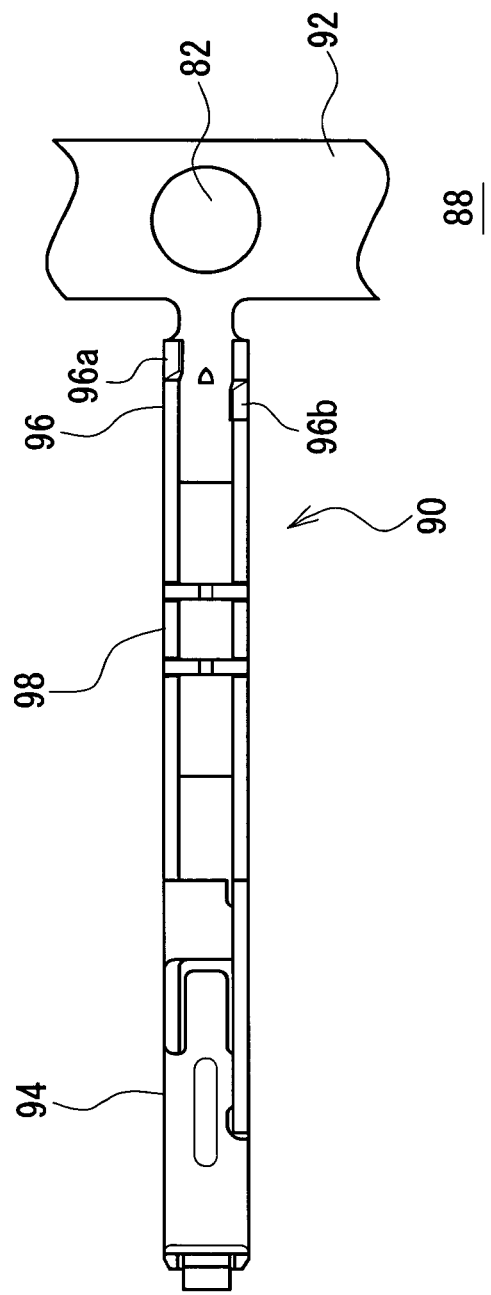
FIG. 11 is a view showing a plated member according to a preferred embodiment of the present invention.
Figure 13A:
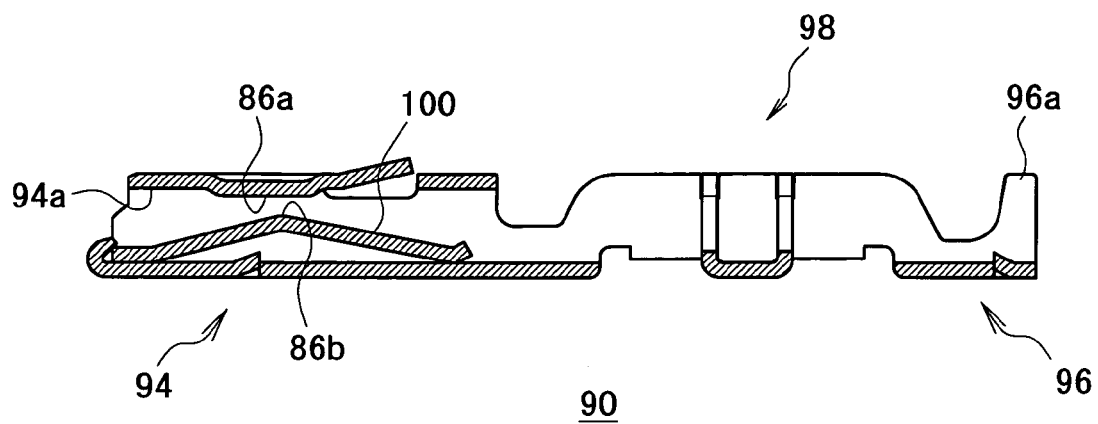
FIG. 13 is a view showing a plated member according to a preferred embodiment of the present invention.

FIG. 11 shows a state after the terminal metal fitting 90 in the developed state shown in FIG. 10 is subjected to the bending process. When the carrier frame 92 is cut off, the terminal metal fitting 90 shown in FIG. 13A is obtained. FIG. 13A is a sectional view of the female terminal. The female terminal metal fitting 90 cut off from the carrier frame 92 comprises the mating tube portion 94 in a square tube shape into which the male terminal of the component to be connected is inserted, and the crimping section 96 which has the pair of crimping portion 96a and 96b for crimping the end of the electric wire and is extended from the mating tube portion 94. In the mating tube portion 94, the elastic contact portion 100 bended to form a crest is arranged facing to the ceiling plane 94a, and the elastic contact portion 100 and the ceiling plane 94 define the contact portions with the male terminal.

Figure 12:
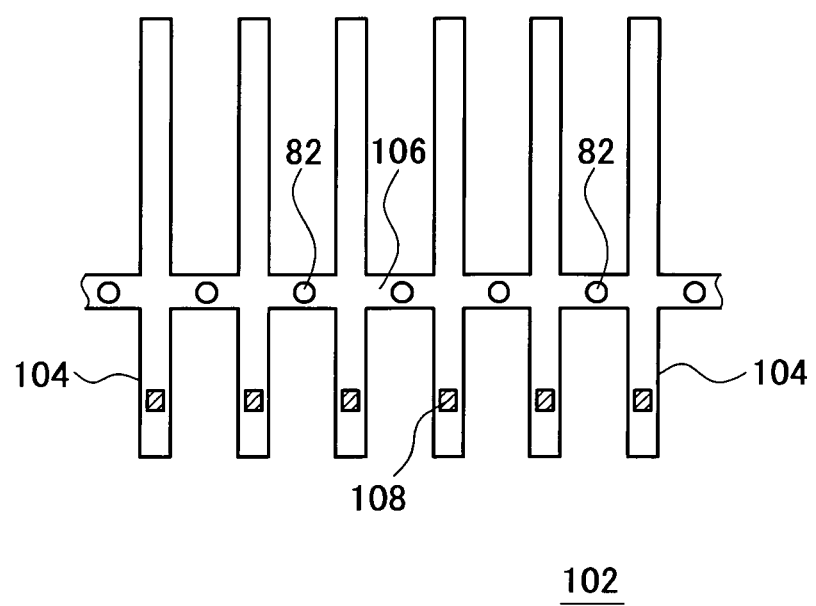
FIG. 12 is a view showing a plated member according to a preferred embodiment of the present invention.

FIG. 12 shows a coupling member 102 comprising a carrier frame 106 and a number of terminal metal fittings 104 which are pressed into a male terminal shape, have one or more spot platings, and are coupled to the carrier frame 106. The tip side to be inserted into the mating tube portion of a female terminal and the base side have the carrier frame 106 therebetween, and a spot plating 108 is formed in a position on the tip side which comes into contact with the contact portion of the female terminal.

Figure 13B:
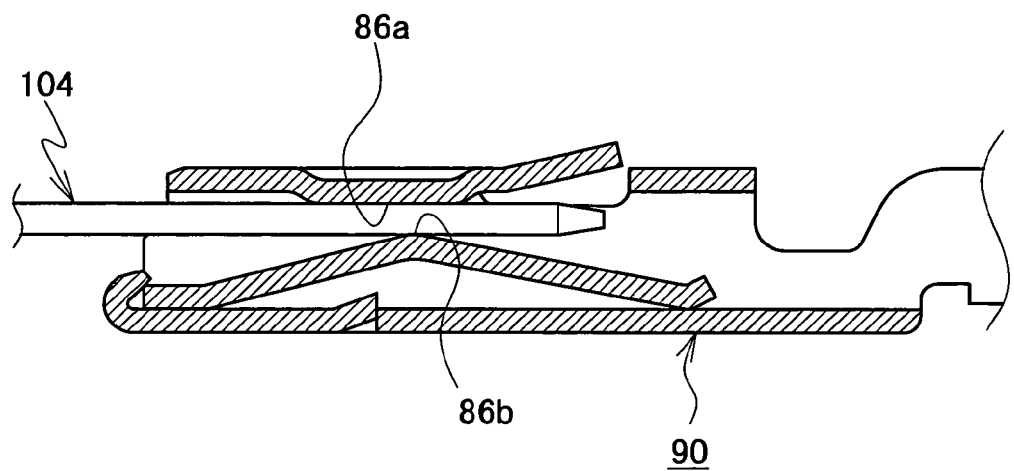

As shown in FIG. 13B, when the male terminal metal fitting 104 is inserted into the mating tube portion 94 of the female terminal metal fitting 90, the contact portions of the male terminal metal fitting 104 and of the female terminal metal fitting 90 come into contact to provide conduction between them.

The present invention is not limited to the preferred embodiments of the present invention described above, and variations may be made within the scope of the intension of the present invention.

For example, FIG. 2 shows that the quartz glass plate is arranged between the imaging lens and the plating solution; however, if the imaging lens is not splashed with the plating solution, the quartz glass plate is not needed.

The invention claimed is:

1. A partial plating method to selectively plate a region of a member, the method comprising the step of:
   providing a member to be plated, wherein the member is made of copper or copper alloy and wherein the member defines a positioning hole for positioning the region to be plated;
   contacting the member with a plating solution comprising gold and cobalt ions;
   conveying the member to be plated in the plating solution such that the positioning hole of the member is located outside a flow path of the plating solution;
   projecting a laser beam having a wavelength of 330 nm or more and 450 nm or less onto the region to be plated, wherein the laser beam is not absorbed by the plating solution;
   scanning the laser beam from a scanning start position in synchronization with the movement of the member being conveyed in the plating solution for a fixed period of time, and the laser beam is then returned to the scanning start position after the fixed period of time, wherein the positioning hole of the member is detected by a photoelectronic sensor in synchronization with movement of the member being conveyed in the plating solution; and
   applying hard gold plating onto the region of the member where the laser beam is projected.

2. The partial plating method according to, claim 1, wherein the laser beam is scanned by being reflected by a movable mirror.

3. The partial plating method according to claim 1, wherein the laser beam is scanned by translational reciprocating motion of the laser beam emitting end opposing to the member to be plated of a laser beam source or a beam source optical system including a laser beam source, the translational reciprocating motion includes synchronizing for the fixed period of time with the movement of the member to be plated being conveyed in the plating solution and returning the laser beam emitting end to the scanning start position.

4. The partial plating method according to claim 1, wherein the member to be plated is conveyed in the plating solution and is halted for a fixed period of time when the region to be plated of the member to be plated is placed in a projection position of the laser beam.

5. The partial plating method according to claim 1, wherein the laser beam is emitted from a plurality of laser beam sources.

6. The partial plating method according to, claim 1 wherein the plating solution flows in a direction different from a conveying direction of the member to be plated and a projecting direction of the laser beam.

7. A production method of a connector terminal comprising a step of forming one or more hard gold spot platings on a contact portion of a connection terminal by the partial plating method according to claim 1.

8. The partial plating method according to claim 1, wherein the laser beam used with a gold plating solution including cobalt ions for hard gold plating is an argon laser beam.

9. The partial plating method according to claim 1, wherein prior to plating, further comprising a step of applying a coating of nickel on the member.

* * * * *